(12) United States Patent
Iwasawa et al.

(10) Patent No.: US 10,976,530 B2
(45) Date of Patent: Apr. 13, 2021

(54) ZOOM LENS AND IMAGING APPARATUS

(71) Applicant: Tamron Co., Ltd., Saitama (JP)

(72) Inventors: Yoshito Iwasawa, Saitama (JP); Kazuya Watanabe, Saitama (JP); Wataru Kusaka, Saitama (JP)

(73) Assignee: Tamron Co., Ltd., Saitama (JP)

( * ) Notice: Subject to any disclaimer, the term of this patent is extended or adjusted under 35 U.S.C. 154(b) by 591 days.

(21) Appl. No.: 15/844,881

(22) Filed: Dec. 18, 2017

(65) Prior Publication Data

US 2018/0284407 A1    Oct. 4, 2018

(30) Foreign Application Priority Data

Mar. 30, 2017  (JP) .............................. JP2017-068694

(51) Int. Cl.
 *G02B 15/173* (2006.01)
 *G02B 15/14* (2006.01)
 *G02B 27/00* (2006.01)
 *G02B 13/02* (2006.01)

(52) U.S. Cl.
 CPC ......... *G02B 15/1461* (2019.08); *G02B 13/02* (2013.01); *G02B 15/145105* (2019.08); *G02B 15/173* (2013.01); *G02B 27/0025* (2013.01)

(58) Field of Classification Search
 CPC .......... G02B 15/173; G02B 15/143105; G02B 13/02; G02B 27/0025
 USPC ................................................. 359/690, 785
 See application file for complete search history.

(56) References Cited

U.S. PATENT DOCUMENTS

| | | | |
|---|---|---|---|
| 5,691,851 A | 11/1997 | Nishio et al. | |
| 8,068,281 B2 | 11/2011 | Adachi et al. | |
| 8,537,249 B2 | 9/2013 | Imaoka et al. | |
| 8,599,491 B2 | 12/2013 | Kon et al. | |
| 8,665,330 B2 | 3/2014 | Chien | |
| 8,934,177 B2 | 1/2015 | Imaoka et al. | |
| 9,172,882 B2 | 10/2015 | Uchida et al. | |
| 10,725,272 B2 | 7/2020 | Machida | |
| 2012/0268832 A1 | 10/2012 | Chen | |
| 2014/0184856 A1 | 7/2014 | Iwasawa et al. | |
| 2016/0025955 A1* | 1/2016 | Ito ..................... | G02B 27/0018 359/557 |
| 2017/0139189 A1 | 5/2017 | Iwasawa et al. | |

FOREIGN PATENT DOCUMENTS

| | | |
|---|---|---|
| CN | 102156343 A | 8/2011 |
| JP | S61286813 A | 12/1986 |
| JP | H777656 A | 3/1995 |

(Continued)

*Primary Examiner* — Travis S Fissel
(74) *Attorney, Agent, or Firm* — The Webb Law Firm

(57) ABSTRACT

The present invention provides a zoom lens which is the zoom lens that includes a first lens group G1 having positive refractive power, a second lens group G2 having negative refractive power, and a third lens group G3 having positive refractive power in order from an object side, and changes focal length by changing an air interval between the respective lens groups, the zoom lens including a focus group F constituted from one lens in or after the third lens group G3, moving only the focus group F along an optical axis direction when focusing from an infinity object to a proximity object, and satisfying specific conditional expressions, and an imaging apparatus including the zoom lens.

19 Claims, 9 Drawing Sheets

(56) References Cited

FOREIGN PATENT DOCUMENTS

| | | | |
|---|---|---|---|
| JP | 2009236973 | A | 10/2009 |
| JP | 2009265652 | A | 11/2009 |
| JP | 2012042864 | A | 3/2012 |
| JP | 2012047814 | A | 3/2012 |
| JP | 2012073308 | A | 4/2012 |
| JP | 2012242617 | A | 12/2012 |
| JP | 2013025147 | A | 2/2013 |
| JP | 2013117667 | A | 6/2013 |
| JP | 2014102462 | A | 6/2014 |
| JP | 2014126850 | A | 7/2014 |
| JP | 2014157168 | A | 8/2014 |
| JP | 2014186306 | A | 10/2014 |
| WO | 2012026088 | A1 | 3/2012 |
| WO | 2017047757 | A1 | 7/2018 |

\* cited by examiner

ZOOM LENS AND IMAGING APPARATUS

CROSS-REFERENCE TO RELATED APPLICATION

This application claims priority to Japanese Patent Application No. 2017-068694 filed Mar. 30, 2017, the disclosure of which is hereby incorporated in its entirety by reference.

BACKGROUND OF THE INVENTION

Field of the Invention

The present invention relates to a zoom lens, and an imaging apparatus including the zoom lens. Specifically, the present invention relates to a small-sized telephoto zoom lens suitable for a photographing optical system of a digital input/output device such as a digital still camera or a digital video camera, for example, and an imaging apparatus including the zoom lens.

Description of Related Art

Lately, a photographing apparatus using a solid-state imaging sensor such as a digital still camera has come into widespread use. Accordingly, performance improvement and miniaturization of a lens for imaging are advancing, and a small-sized imaging apparatus system is rapidly spreading. For the lens for imaging, the demand for miniaturization is strong together with the demand for the performance improvement. In particular, the demand for miniaturization and performance improvement is strong for a zoom lens for imaging of a long focal length at a telephoto end such as a telephoto system zoom lens.

For such a demand, a zoom lens described in Patent Literature 1 (Japanese Patent Laid-Open No. 2014-126850) realizes a telephoto system zoom lens, a zoom ratio of which is about four times and a focal length of which at a telephoto end is about 600 mm for a 35 mm version, even while it is small in size (for example, see Patent Literature 1).

Now, for the zoom lens described in Patent Literature 1 described above, since a focus group is constituted from a plurality of lenses, aberration fluctuation during focusing is suppressed, and a high optical performance is maintained in an entire focusing area. However, since the focus group is heavy and a focus driving mechanism for driving the focus group is also enlarged, it is insufficient in terms of weight reduction and miniaturization of an entire lens unit.

SUMMARY OF THE INVENTION

An object of the present invention is to provide a telephoto system zoom lens capable of reducing weight of a focus group and securing a flange back suitable for an interchangeable lens while maintaining a high optical performance, and an imaging apparatus.

In order to achieve the object, a zoom lens according to the present invention is the zoom lens that includes a first lens group having positive refractive power, a second lens group having negative refractive power, and a third lens group having positive refractive power in order from an object side, and changes focal length by changing an air interval between the respective lens groups, and the zoom lens includes a focus group constituted from one lens in or after the third lens group, moves only the focus group along an optical axis direction when focusing from an infinity object to a proximity object, and satisfies the following conditional expressions.

$$-1.60 < \beta3rw < -0.35 \quad (1)$$

$$0.75 < f1\sqrt{(fw \times ft)} < 1.25 \quad (2)$$

Note that, $\beta3rw$: a composite lateral magnification of all lenses arranged from a lens on the most object side in the third lens group to a lens on a most image side in the zoom lens when focusing at infinity at a wide-angle end, f1: a focal length of the first lens group, fw: a focal length of the entire zoom lens at the wide-angle end, and ft: a focal length of the entire zoom lens at a telephoto end.

In addition, in order to achieve the object, an imaging apparatus according to the present invention includes the zoom lens according to the present invention, and an image sensor that converts an optical image formed by the zoom lens to an electric signal on the image side of the zoom lens.

According to the present invention, a telephoto system zoom lens capable of reducing weight of a focus group and securing a flange back suitable for an interchangeable lens while maintaining a high optical performance, and an imaging apparatus are provided.

DESCRIPTION OF THE INVENTION

Figure 1:
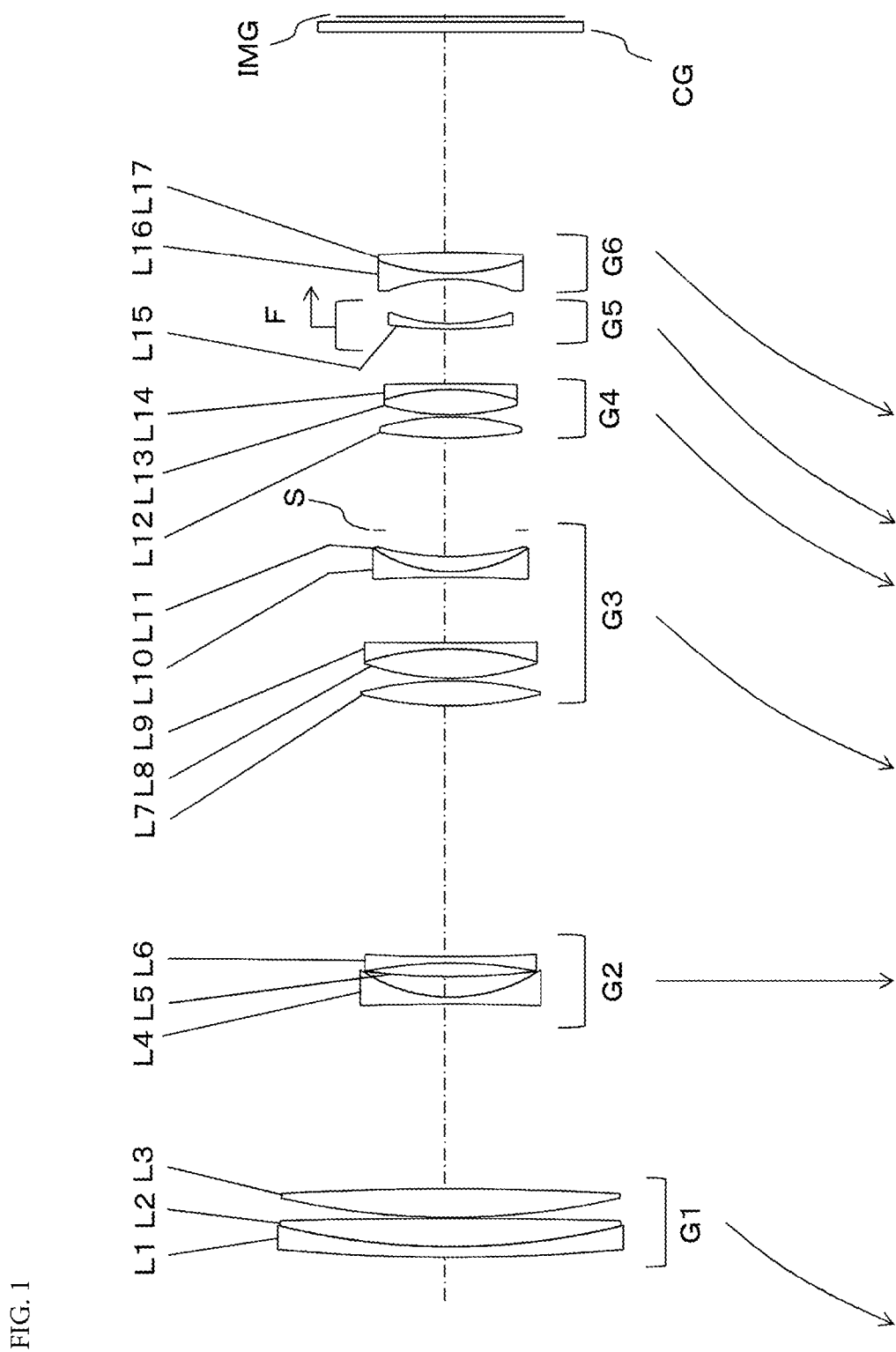
FIG. 1 is a sectional view illustrating a lens construction example when focusing at infinity at a wide-angle end of a zoom lens in an example 1 of the present invention.

Hereinafter, embodiments of a zoom lens and an imaging apparatus according to the present invention will be described. Note that the zoom lens and the imaging apparatus described below are one aspect of the zoom lens and the imaging apparatus according to the present invention, and the zoom lens according to the present invention is not limited to the following aspect.

1. Zoom Lens 1-1. Optical Construction

The zoom lens (variable magnification optical system) of the present embodiment is the zoom lens that includes a first lens group having positive refractive power, a second lens group having negative refractive power, and a third lens group having positive refractive power in order from an object side, and changes focal length by changing an air interval between the respective lens groups, and the zoom lens includes a focus group constituted from one lens in or after the third lens group, moves only the focus group along an optical axis direction when focusing from an infinity object to a proximity object, and satisfies a conditional expression (1) and a conditional expression (2) to be described later.

In the zoom lens of the present embodiment, by adopting the above-described construction and satisfying the conditional expression (1) and the conditional expression (2) to be described later, a telephoto system zoom lens capable of reducing weight of the focus group and securing a flange back suitable for an interchangeable lens while maintaining a high optical performance is realized. In particular, in the zoom lens, by adopting a telephoto type power arrangement, converging an incident luminous flux by the first lens group and diverging it by the second lens group, a small-sized zoom lens, an entire optical length of which is short compared to a focal length, can be realized while making the zoom lens telephoto.

In addition, in the zoom lens, even when large negative refractive power is arranged in the second lens group, by increasing a lateral magnification of the second lens group by the first lens group and the third lens group having the positive refractive power and arranged before and after the second lens group, the telephoto system zoom lens with strong telephoto tendency is attained and the zoom lens can be made telephoto.

Note that, in the zoom lens of the present embodiment, as described above, the zoom lens includes the first lens group having the positive refractive power, the second lens group having the negative refractive power, and the third lens group having the positive refractive power in order from the object side, and changes focal length by changing the air interval between the respective lens groups, and as long as the focus group is equipped in or after the third lens group, the number of the lens groups equipped in the zoom lens and a specific construction of each lens group are not limited in particular. Hereinafter, a preferable aspect of the focus group and a preferable lens group construction of the zoom lens will be described.

(1) Focus Group

The focus group is constituted from one lens. Note that one lens refers to a lens generally called a single lens (spherical lens/aspherical lens). In addition, examples of the aspherical lens include the one with a precisely polished surface, a mold lens (made of a glass material, made of plastic), and a compound aspherical lens with a surface to which an aspherical film is stuck. That is, in the zoom lens, the number of the lenses constituting the focus group is one, and a focus group constituted from the plurality of lenses such as a focus group composed of a cemented lens for which the plurality of lenses are cemented without the air interval or a focus group composed by arranging the plurality of lenses at the air interval is different from the focus group in the present invention.

By constituting the focus group from one lens, compared to the case of constituting the focus group from the plurality of lenses, the focus group can be made light in weight and miniaturized. Therefore, a drive mechanism (mechanical device) for driving the focus group can be also miniaturized, and weight reduction and miniaturization of an entire lens unit including a lens barrel of the zoom lens can be realized. In addition, since the focus group can be made light in weight, quick auto-focusing can be also realized.

Furthermore, by constituting the focus group from one lens, compared to the case of a focus group in which a plurality of lenses are arranged at the air interval, various manufacturing errors such as an eccentricity error and an error of the air interval between the lenses can be reduced. Therefore, decline of an optical performance due to the manufacturing error can be suppressed, and the zoom lens with a high optical performance can be manufactured.

The refractive power of the focus group can be either positive or negative, but it is preferable to have the negative refractive power from a viewpoint of miniaturizing the zoom lens.

Note that the focus group may be constituted as one lens group that moves independent of the other lens groups during changing focal length, or may be constituted as a part of one of the lens groups constituting the zoom lens. In the zoom lens, one lens group is composed of the lenses adjacent to each other, and for the lenses included in one lens group, a direction of movement and a moving amount in an optical axis direction are all the same during changing focal length. In addition, for the lens groups adjacent to each other, the direction of the movement and the moving amount in the optical axis direction are different during changing focal length. Note that one lens group may be constituted from only one lens. One lens in this case is, as described above, the single lens or the aspherical lens (glass mold lens or composite aspherical lens).

Then, the focus group is constituted as a part of one of the lens groups constituting the zoom lens as follows. For example, in the case that the focus group is constituted as a part of the third lens group, the focus group is moved along the optical axis direction or fixed integrally with the third lens group during changing focal length. Then, when focusing from an infinity object to a proximity object, of the lenses constituting the third lens group, only the lenses constituting the focus group are moved along the optical axis direction. In addition, in the case that the focus group is constituted as a part of the third lens group, the lens group composed of all the lenses arranged on the object side of the focus group in the third lens group or the lens group composed of all the lenses arranged on an image side of the focus group in the third lens group is called a partial lens group. It is similar in the case that the focus group is constituted as a part of the lens group other than the third lens group.

In the zoom lens, the focus group may be equipped in or after the third lens group, and the arrangement is not limited in particular. As described above, the focus group may be constituted as a part of the third lens group, or may be constituted as a part or the whole of a fourth lens group or the lens group thereafter. However, when miniaturizing the zoom lens and the entire lens unit, it is preferable that the focus group is provided more on the image side than the third lens group. That is, it is preferable that the focus group is arranged in or after the fourth lens group. By providing the focus group on the image side of the third lens group having the positive refractive power, a pencil of light made incident on the focus group can be converged by the third lens group. Therefore, the focus group can be miniaturized in a radial direction and made light in weight. Thus, from a reason similar to the above-described reason, the zoom lens and the entire lens unit can be miniaturized and made light in weight, and the quick auto-focusing can be realized.

From a similar point, in the zoom lens, it is preferable that the focus group is arranged on the image side of the lens group or the partial lens group having the positive refractive power at the air interval. That is, in the case that the focus group is constituted as a part of the third lens group or the lens group thereafter, it is preferable that the lens group or the partial lens group having the positive refractive power is arranged at the air interval on the object side of the focus group. In addition, in the case that the focus group is constituted as one lens group of the third lens group and thereafter, it is preferable that the lens group having the positive refractive power is arranged at the air interval on the object side of the focus group. In these cases, since the pencil of light made incident on the focus group can be converged further by the lens group or the partial lens group arranged immediately before the focus group, the focus group can be made light in weight and miniaturized further. In addition, since the pencil of light made incident on the focus group is converged, even when the focus group is moved during changing focal length or during focusing, an angle change of a light beam made incident on the focus group during the time can be reduced. That is, aberration fluctuation accompanying the movement of the focus group can be suppressed, and an aberration amount generated in the focus group is reduced. Thus, even when a distance to an object is short, that is, even during proximity focusing, an excellent aberration correction state can be maintained regardless of the focal length.

In addition, when miniaturizing the zoom lens and the entire lens unit while improving a performance of the zoom lens, it is preferable to include at least one other lens group on the image side of the focus group. In the zoom lens, a diameter of the lenses constituting the lens group arranged on the most image side (called "final lens group", hereinafter) is generally larger than a diameter of the lenses constituting the lens group arranged more on the object side than the final lens group. By the construction that the focus group is the lens group other than the final lens group and at least one other lens group is arranged on the image side of the focus group, the focus group can be made light in weight and miniaturized further. Note that, it is preferable that the final lens group has a positive refractive power, when realizing a bright optical system of a small F-number. Furthermore, it is preferable that the final lens group has a negative refractive power, when realizing the optical system of the short entire optical length.

(2) Lens Group Construction

Note that the zoom lens of the present embodiment includes the first lens group to the third lens group, the focus group may be provided in or after the third lens group, and the number of the lens groups constituting the zoom lens, a power arrangement, a position of the focus group and a specific lens construction of each lens group are not limited in particular. For example, the zoom lens may be constituted from three positive, negative and positive groups, and a part of the third lens group may be the focus group. However, as described above, since it is preferable to provide the focus group in or after the fourth lens group, it is preferable that the zoom lens is constituted from four or more groups. In addition, since it is preferable that the focus group is the lens group other than the final lens group, it is preferable that the zoom lens is constituted from five or more groups.

Further, it is preferable that the zoom lens is constituted from six or more groups since the focus group can be made light in weight and miniaturized further by making the fourth lens group have the positive refractive power and making the fifth lens group be the focus group.

(3) Stop

In the zoom lens, an arrangement of a stop is not limited in particular. No matter what position inside the zoom lens the stop is arranged, the zoom lens can obtain effects relating to the present invention. In addition, the stop may be fixed to an image plane or may be movably constituted.

(4) Vibration-Proof Lens Group

The zoom lens may include a so-called vibration-proof lens group. Note that the vibration-proof lens group is the lens group composed of one lens or a plurality of lenses constituted to be movable roughly vertically to an optical axis. By moving the vibration-proof lens group in a direction roughly vertical to the optical axis, the vibration-proof lens group can be moved in the direction roughly vertical to the optical axis. Thus, an image blur accompanying vibrations during imaging such as a camera shake can be corrected. The vibration-proof lens group can be any one lens group of the lens groups constituting the zoom lens. In addition, the vibration-proof lens group may be a part of any one lens group constituting the zoom lens.

1-2. Operation

Next, an operation during changing focal length and during the focusing of the zoom lens.

(1) Operation During Changing Focal Length

The zoom lens changes focal length by changing the air interval between the respective lens groups. The air interval between the respective lens groups may be changed by moving all the lens groups constituting the zoom lens along the optical axis direction during changing focal length, or the air interval between the respective lens groups may be changed by making some lens groups fixed groups and allowing the other movable groups to move in the optical axis direction during changing focal length.

For example, during changing focal length from the wide-angle end to the telephoto end, the respective lens groups can be moved or fixed such that the air interval between the first lens group and the second lens group is widened and the air interval between the second lens group and the third lens group is narrowed.

In addition, in the zoom lens, when the first lens group is moved to the object side during changing focal length from the wide-angle end to the telephoto end, the entire optical length of the zoom lens at the wide-angle end can be shortened. In this case, when the lens barrel is constituted to be freely extended and contracted in a nest shape or the like for example, a lens barrel length is extended accompanying the movement of the first lens group during changing focal length from the wide-angle end to the telephoto end, and the lens barrel length is shortened during changing focal length from the telephoto end to the wide-angle end, the lens barrel length in a wide-angle end state can be shortened, and the lens unit can be miniaturized.

Further, during changing focal length, when all the lens groups are made the movable groups, by optimally moving the position of each lens group according to the focal length, the aberration can be excellently corrected in an entire zoom range. In addition, by making the final lens group a fixed group or making some lens groups fixed groups, the drive mechanism for moving the movable groups during changing focal length can be made light in weight and miniaturized, and the entire lens unit of the zoom lens can be made light in weight and miniaturized.

(2) Operation During Focusing

The zoom lens performs the focusing from an infinity object to a proximity object by moving the focus group along the optical axis direction. At the time, it is assumed that only the focus group is moved, and the other lens groups (including the partial lens group) are fixed in the optical axis direction. By constituting the focus group from one lens and moving only the focus group, as described above, the drive mechanism can be miniaturized or the like, and the quick auto-focusing or the like can be realized.

1-3. Conditional Expression

Next, conditions to be satisfied by the zoom lens, or the conditions to be preferably satisfied will be described. The zoom lens adopts the above-described construction, and also satisfies the conditional expression (1) and the condition expression (2) below.

$$-1.60 < \beta 3rw < -0.35 \qquad \text{Conditional expression (1):}$$

$$0.75 < f1\sqrt{(fw \times ft)} < 1.25 \qquad \text{Conditional expression (2):}$$

Note that $\beta 3rw$: a composite lateral magnification of all lenses arranged from a lens on the most object side in the third lens group to a lens on the most image side in the zoom lens when focusing at infinity at the wide-angle end, f1: a focal length of the first lens group, fw: a focal length of the entire zoom lens at the wide-angle end, and ft: a focal length of the entire zoom lens at the telephoto end.

1-3-1. Conditional Expression (1)

The conditional expression (1) is an expression that stipulates the composite lateral magnification of all lenses arranged from the lens on the most object side in the third lens group to the lens on the most image side in the zoom lens when focusing at infinity at the wide-angle end. That is, it is the expression that stipulates the composite lateral magnification when focusing at infinity at the wide-angle end by all the lenses that are the lens on the most object side in the third lens group and the lenses arranged thereafter. By satisfying the conditional expression (1), the flange back suitable for the imaging apparatus to which an interchangeable lens system is applied, such as a single-lens reflex camera or a mirrorless single-lens camera, can be secured.

In contrast, when a numerical value of the conditional expression (1) becomes an upper limit value or larger, the flange back at the wide-angle end becomes short, it becomes difficult to secure the flange back suitable for the interchangeable lens system, and it is not preferable. On the other hand, when the numerical value of the conditional expression (1) becomes a lower limit value or smaller, the flange back at the wide-angle end becomes long exceeding the flange back requested to the interchangeable lens system. That is, the entire optical length of the zoom lens at the wide-angle end becomes long. Therefore, it is difficult to miniaturize the zoom lens, and it is not preferable.

When obtaining the above-described effects, it is preferable that the lower limit value of the conditional expression (1) is −1.50, it is more preferable to be −1.48, and it is further preferable to be −1.45. In addition, it is preferable that the upper limit value of the conditional expression (1) is −0.38, it is more preferable to be −0.40, it is further preferable to be −0.45, and it is furthermore preferable to be −0.48.

1-3-2. Conditional Expression (2)

In the conditional expression (2), "$\sqrt{(fw \times ft)}$" indicates the focal length (referred to as "intermediate focal length", hereinafter) of the entire zoom lens at an intermediate focal length position of the zoom lens. The conditional expression (2) is the expression that stipulates a ratio between the focal length of the first lens group and the intermediate focal length of the entire zoom lens. By satisfying the conditional expression (2), degradation of axial chromatic aberration at the telephoto end can be suppressed while shortening the entire optical length compared to the focal length. Therefore, the small-sized zoom lens of the higher performance in the entire zoom range can be realized.

In contrast, when the numerical value of the conditional expression (2) becomes the upper limit value or larger, since the focal length of the first lens group becomes long for the zoom range of the zoom lens, the entire optical length becomes long, it becomes difficult to miniaturize the zoom lens, and it is not preferable. On the other hand, when the numerical value of the conditional expression (2) becomes the lower limit value or smaller, since the focal length of the first lens group becomes short for the zoom range of the zoom lens, it becomes difficult to correct the axial chromatic aberration at the telephoto end. Therefore, since the number of the lenses needed for aberration correction needs to be increased in order to realize the high-performance zoom lens in the entire zoom range, it becomes difficult to realize the miniaturization and the performance improvement of the zoom lens together.

When obtaining the above-described effects, it is preferable that the lower limit value of the conditional expression (2) is 0.80, and it is more preferable to be 0.85. In addition, it is preferable that the upper limit value of the conditional expression (2) is 1.20, and it is more preferable to be 1.15.

1-3-3. Conditional Expression (3)

It is preferable that the zoom lens satisfies the following conditional expression.

$$0.02 < Crfr/ft < 0.11 \qquad \text{Conditional expression (3):}$$

Note that

Crfr: a radius of curvature of a lens surface on the most image side in the focus group, and ft: the focal length of the entire zoom lens at the telephoto end.

The conditional expression (3) is the expression that stipulates a ratio between the radius of curvature of the lens surface on the most image side in the focus group and the focal length of the entire zoom lens at the telephoto end. First, since a numerical range of the conditional expression (3) is positive, it is obtained that a value of Crfr is positive. That is, in the zoom lens, it is preferable that the lens surface on the most image side in the focus group is concave to the image side. Then, by making the lens surface on the most image side in the focus group have a radius of curvature satisfying the conditional expression (3) with respect to the focal length of the entire zoom lens at the telephoto end, various kinds of aberration such as Field Curvature or distortion aberration can be excellently corrected, and a zoom lens having higher performance can be realized in the entire focusing area.

In contrast, when the numerical value of the conditional expression (3) becomes the upper limit value or larger, that is, when the radius of curvature of the lens surface on the most image side in the focus group to the focal length of the entire zoom lens at the telephoto end becomes large, it becomes difficult to correct the distortion aberration, and it is not preferable. In addition, when the numerical value of the conditional expression (3) becomes the lower limit value or smaller, that is, when the radius of curvature of the lens surface on the most image side in the focus group to the focal length of the entire zoom lens at the telephoto end becomes small, it becomes difficult to correct the Field Curvature, and it is not preferable.

When obtaining the above-described effects, it is preferable that the lower limit value of the conditional expression (3) is 0.03, it is further preferable to be 0.04, and it is furthermore preferable to be 0.05. In addition, it is preferable that the upper limit value of the conditional expression (3) is 0.10, it is further preferable to be 0.095, and it is furthermore preferable to be 0.09.

1-3-4. Conditional Expression (4)

In the zoom lens, it is preferable that the focus group is constituted from one lens having the negative refractive power, and the following conditional expression is satisfied.

$$40.0 < vdLfn \quad \text{Conditional expression (4):}$$

Note that vdLfn: an Abbe number in a d line of the lens having the negative refractive power constituting the focus group.

The conditional expression (4) is the expression that stipulates, when the focus group is constituted from one lens having the negative refractive power, the Abbe number to the d line of the lens having the negative refractive power. By satisfying the conditional expression (4), that is, by constituting the focus group by a negative lens of dispersion smaller than that of a lens whose Abbe number is 40.0, the axial chromatic aberration and chromatic aberration of magnification generated in the focus group can be reduced. Therefore, even in the case of constituting the focus group from one negative lens, the chromatic aberration that tends to be generated when focusing the proximity object can be excellently corrected, and the high optical performance can be realized in the entire focusing area.

When obtaining the above-described effects, it is preferable that the lower limit value of the conditional expression (4) is 42.0, and it is further preferable to be 44.0. Note that, as the Abbe number becomes larger, the dispersion of the lens becomes smaller so that the chromatic aberration is not easily generated. Thus, from a viewpoint of reducing the chromatic aberration generated in the focus group, it is preferable that the value of the conditional expression (4) is larger, and it is not needed to determine the upper limit value in particular. However, the Abbe number of an existing glass material is about 100. In addition, the glass material of the low dispersion with the large Abbe number is generally expensive. Thus, from a viewpoint of a cost when manufacturing the zoom lens, it is preferable that the upper limit value of the conditional expression (4) is 100, it is more preferable to be 85.0, and it is further preferable to be 77.0.

1-3-5. Conditional Expression (5)

It is preferable that the zoom lens satisfies the following conditional expression.

$$-0.25 < (Crff + Crfr)/(Crff - Crfr) < 5.00 \quad \text{Conditional expression (5):}$$

Note that

Crff: the radius of curvature of the lens surface on the most object side in the focus group, and Crfr: the radius of curvature of the lens surface on the most image side in the focus group.

The conditional expression (5) is the expression for stipulating a shape of the lens surface of the lens constituting the focus group. When the conditional expression (5) is satisfied, the lens constituting the focus group has a shape that the curvature is stronger on the surface on the image side than on the surface on the object side. By constituting the focus group by the lens of the shape satisfying the conditional expression (5), the strong negative refractive power is arranged in the focus group and the moving amount of the focus group when focusing the proximity object can be reduced. Simultaneously with that, fluctuation of coma aberration and the Field Curvature accompanying the movement of the focus group is suppressed, and the coma aberration and the Field Curvature can be excellent corrected even when focusing the proximity object. Therefore, the miniaturization of the zoom lens and the performance improvement in the entire focusing area can be realized, and it is preferable.

When obtaining the above-described effects, it is preferable that the lower limit value of the conditional expression (5) is −0.20, it is further preferable to be −0.10, and it is furthermore preferable to be 0.50. In addition, it is preferable that the upper limit value of the conditional expression (5) is 4.00, it is further preferable to be 3.00, and it is furthermore preferable to be 2.50.

1-3-6. Conditional Expression (6)

It is preferable that the zoom lens satisfies the following conditional expression.

$$0.39 < f1/ft < 0.70 \quad \text{Conditional expression (6):}$$

Note that f1: the focal length of the first lens group, and ft: the focal length of the entire zoom lens at the telephoto end.

The conditional expression (6) is the expression that stipulates the ratio between the focal length of the first lens group and the focal length of the entire zoom lens at the telephoto end. By satisfying the conditional expression (6), it becomes easy to realize the zoom lens of a larger telephoto ratio while maintaining the high optical performance. That is, it becomes easier to realize the high-performance zoom lens of the short entire optical length compared to the focal length of the entire zoom lens at the telephoto end.

In contrast, when the numerical value of the conditional expression (6) becomes the upper limit value or larger, that is, when the focal length of the first lens group becomes long for the focal length of the entire zoom lens at the telephoto end, since the entire optical length of the zoom lens at the telephoto end becomes long, it is not preferable when miniaturizing the zoom lens. On the other hand, when the numerical value of the conditional expression (6) becomes the lower limit value or smaller, that is, when the focal length of the first lens group becomes short for the focal length of the entire zoom lens at the telephoto end, it becomes difficult to correct the axial chromatic aberration and the spherical aberration at the telephoto end, and it becomes difficult to realize the zoom lens of the high performance in the entire zoom range.

When obtaining the above-described effects, it is preferable that the lower limit value of the conditional expression (6) is 0.40, it is more preferable to be 0.41, it is further preferable to be 0.44, and it is furthermore preferable to be 0.46. In addition, it is preferable that the upper limit value of the conditional expression (6) is 0.68, it is further preferable to be 0.65, and it is furthermore preferable to be 0.62.

1-3-7. Conditional Expression (7)

It is preferable that the zoom lens satisfies the following conditional expression.

$$-15.0<\{1-(\beta ft \times \beta ft)\} \times \beta ftr \times \beta ftr <-5.5 \quad \text{Conditional expression (7):}$$

Note that

βft: the lateral magnification when focusing at infinity at the telephoto end of the focus group, and βftr: the composite lateral magnification of the entire lens group arranged more on the image side than the focus group when focusing at infinity at the telephoto end.

The conditional expression (7) is the expression that stipulates focus sensitivity of the focus group, that is, an image plane moving amount when the focus group is moved by a unit amount. By satisfying the conditional expression (7), the moving amount of the focus group when focusing from the infinity object to the proximity object can be within an appropriate range, the quick auto-focusing can be realized, and it becomes easier to miniaturize the zoom lens.

In contrast, when the numerical value of the conditional expression (7) becomes the upper limit value or larger, that is, when the focus sensitivity of the focus group becomes too low, the moving amount of the focus group when focusing from the infinity object to the proximity object becomes large, the entire optical length of the zoom lens becomes long, it becomes difficult to realize the quick auto-focusing, and it is not preferable. On the other hand, when the numerical value of the conditional expression (7) becomes the lower limit value or smaller, that is, when the focus sensitivity of the focus group becomes too high, it is needed to highly accurately perform position control of the focus group for aligning a focusing position and it becomes difficult to control the focus group so that it is not preferable.

When obtaining the above-described effects, it is preferable that the lower limit value of the conditional expression (7) is −14.5, it is more preferable to be −14.0, it is further preferable to be −13.5, it is still further preferable to be −13.0, and it is furthermore preferable to be −12.5. In addition, it is preferable that the upper limit value of the conditional expression (7) is −6.0, it is more preferable to be −6.5, it is further preferable to be −7.0, and it is furthermore preferable to be −8.0.

1-3-8. Conditional Expression (8)

In the zoom lens, when the first lens group is constituted to be moved to the object side during changing focal length from the wide-angle end to the telephoto end, it is preferable to satisfy the following conditional expression.

$$0.10<|X1|/ft<0.26 \quad \text{Conditional expression (8):}$$

Note that

X1: the moving amount of the first lens group to the object side during changing focal length from the wide-angle end to the telephoto end.

The conditional expression (8) is the expression that stipulates the moving amount of the first lens group when the first lens group is constituted to be moved to the object side during changing focal length from the wide-angle end to the telephoto end. By satisfying the conditional expression (8), the moving amount of the first lens group during changing focal length is settled within the appropriate range, and the more excellent power arrangement can be performed respectively to each lens group. Therefore, various kinds of the aberration such as the axial chromatic aberration and the spherical aberration can be excellently corrected with the smaller number of the lenses, and it becomes easier to realize the high-performance zoom lens in the entire focusing area. Simultaneously with that, the zoom lens can be further miniaturized. In addition, since the moving amount of the focus group during focusing can be within the appropriate range, the quick auto-focusing is realized, and drive control of the focus group can be appropriately performed.

In contrast, when the numerical value of the conditional expression (8) becomes the upper limit value or larger, the moving amount of the first lens group during changing focal length from the wide-angle end to the telephoto end becomes large. That is, since it is needed to extend the lens barrel length in a telephoto end state compared to the lens barrel length in the wide-angle end state, a lens barrel structure becomes complicated such as a nest structure or a cam structure of the lens barrel. As a result, the lens barrel becomes large, and the miniaturization and weight reduction of the entire lens unit become difficult. On the other hand, when the numerical value of the conditional expression (8) becomes the lower limit value or smaller, the moving amount of the first lens group during changing focal length from the wide-angle end to the telephoto end becomes small. In this case, in order to realize the zoom lens of a large zoom ratio, it is needed to increase the power distributed to the other lens groups. Therefore, in order to realize the high-performance zoom lens, it is needed to increase the number of the lenses to correct the various kinds of aberration such as the axial chromatic aberration and the spherical aberration, and it becomes difficult to realize the miniaturization and the weight reduction of the zoom lens.

When obtaining the above-described effects, it is preferable that the lower limit value of the conditional expression (8) is 0.12, it is more preferable to be 0.14, and it is further preferable to be 0.16. In addition, it is preferable that the upper limit value of the conditional expression (8) is 0.25.

1-3-9. Conditional Expression (9)

It is preferable that the zoom lens satisfies the following conditional expression.

$$1.40<f1/fw<3.20 \quad \text{Conditional expression (9):}$$

Note that f1: the focal length of the first lens group, and fw: the focal length of the entire zoom lens at the wide-angle end.

The conditional expression (9) is the expression that stipulates the ratio between the focal length of the first lens group and the focal length of the entire zoom lens at the wide-angle end. By satisfying the conditional expression (9), the focal length of the first lens group to the focal length of the entire zoom lens at the wide-angle end is settled within the appropriate range, the optical performance of the zoom lens at the wide-angle end can be improved more, and it is also preferable when performing the miniaturization.

In contrast, when the numerical value of the conditional expression (9) becomes the upper limit value or larger, the focal length of the first lens group becomes long for the focal length at the wide-angle end of the zoom lens, and it is not preferable when miniaturizing the zoom lens and the lens unit at the wide-angle end. On the other hand, when the numerical value of the conditional expression (9) becomes the lower limit value or smaller, the focal length of the first lens group becomes short for the focal length at the wide-angle end of the zoom lens, and it becomes difficult to correct the coma aberration and the distortion aberration at the wide-angle end. Therefore, since the number of the lenses needed for aberration correction needs to be increased in order to realize the high-performance zoom lens in the entire zoom range, it becomes difficult to realize the miniaturization and the performance improvement of the zoom lens together.

When obtaining the above-described effects, it is preferable that the lower limit value of the conditional expression (9) is 1.50, it is more preferable to be 1.60, and it is further preferable to be 1.70. In addition, it is preferable that the upper limit value of the conditional expression (9) is 3.00, it is more preferable to be 2.80, it is further preferable to be 2.60, and it is furthermore preferable to be 2.30.

1-3-10. Conditional Expression (10)

In the zoom lens, the first lens group is assumed to include at least two lenses having the positive refractive power, and it is preferable to satisfy the following conditional expression.

$$64.0 < vd1pave < 83.0 \qquad \text{Conditional expression (10):}$$

Note that vd1pave: an average value of the Abbe number in the d line of all the lenses having the positive refractive power included in the first lens group.

The conditional expression (10) is the expression that stipulates the average value of the Abbe number in the d line of all the lenses having the positive refractive power included in the first lens group. As described above, since the glass material with the large Abbe number is of the low dispersion, when the lens composed of the glass material with the large Abbe number is used, the generation of the chromatic aberration can be suppressed. However, the glass material with the large Abbe number is generally expensive. Therefore, by satisfying the conditional expression (10), the axial chromatic aberration at the telephoto end can be excellently corrected and cost increase of the zoom lens can be suppressed.

In contrast, when the numerical value of the conditional expression (10) becomes the upper limit value or larger, that is, when an average Abbe number of the lenses having the positive refractive power included in the first lens group becomes large, the lens having the positive refractive power used to constitute the first lens group becomes expensive, and it is not preferable from the viewpoint of the cost when manufacturing the zoom lens. On the other hand, when the numerical value of the conditional expression (10) becomes the lower limit value or smaller, since the Abbe number of all the lenses having the positive refractive power included in the first lens group becomes small and the dispersion becomes large, it becomes difficult to correct the axial chromatic aberration at the telephoto end, and it becomes difficult to realize the high-performance zoom lens in the entire zoom range.

When obtaining the above-described effects, it is preferable that the lower limit value of the conditional expression (10) is 65.3, it is more preferable to be 66.2, and it is further preferable to be 67.1. In addition, it is preferable that the upper limit value of the conditional expression (10) is 82.0, it is more preferable to be 80.5, it is further preferable to be 79.0, it is still further preferable to be 77.0, and it is furthermore preferable to be 73.0.

1-3-11. Conditional Expression (11)

It is preferable that the zoom lens satisfies the following conditional expression.

$$0.86 < |\beta 2t| < 20.00 \qquad \text{Conditional expression (11):}$$

Note that

β2t: the lateral magnification of the second lens group when focusing at infinity at the telephoto end.

The conditional expression (11) is the expression that stipulates the lateral magnification when focusing at infinity at the telephoto end of the second lens group. By satisfying the conditional expression (11), the lateral magnification when focusing at infinity at the telephoto end of the second lens group is settled within the appropriate range, and it becomes easier to realize the high-performance zoom lens in the entire zoom range while making the zoom ratio of the zoom lens larger by a zoom action of the second lens group.

In contrast, when the numerical value of the conditional expression (11) becomes the upper limit value or larger, the lateral magnification when focusing at infinity at the telephoto end of the second lens group becomes large, and the zoom action by the second lens group at the telephoto end becomes too large. Therefore, it becomes difficult to correct the various kinds of aberration such as the spherical aberration, the Field Curvature and the coma aberration, it becomes difficult to constitute the high-performance zoom lens with the small number of the lenses, and it becomes difficult to miniaturize the zoom lens. On the other hand, when the numerical value of the conditional expression (11) becomes the lower limit value or smaller, the lateral magnification when focusing at the telephoto end of the second lens group becomes small and the zoom action by the second lens group at the telephoto end becomes too small. Therefore, it is needed to extend the focal length of the first lens group in order to attain the telephoto system zoom lens of the long focal length at the telephoto end, the entire optical length of the zoom lens becomes long and thus it becomes difficult to miniaturize the zoom lens and the lens unit.

When obtaining the above-described effects, it is preferable that the lower limit value of the conditional expression (11) is 0.90, it is more preferable to be 0.95, it is further preferable to be 1.00, and it is furthermore preferable to be 1.05. In addition, it is preferable that the upper limit value of the conditional expression (11) is 18.00, it is more preferable to be 16.0, and it is further preferable to be 15.0.

1-3-12. Conditional Expression (12)

In the zoom lens, it is preferable to satisfy the following conditional expression.

$$1.10 < Bfw/(fw \times \tan \omega w) < 3.50 \qquad \text{Conditional expression (12):}$$

Note that

Bfw: an air conversion length from the surface on the most image side to the image plane at the wide-angle end of the zoom lens, and ωw: a half image viewing angle of a most off-axis main light beam at the wide-angle end of the zoom lens.

The conditional expression (12) is the expression for stipulating the length of the flange back at the wide-angle end of the zoom lens. By satisfying the conditional expression (12), the flange back at the wide-angle end of the zoom lens can have a length suitable for the imaging apparatus to which the interchangeable lens system is applied.

In contrast, when the numerical value of the conditional expression (12) is the upper limit value or larger, the flange back at the wide-angle end of the zoom lens becomes too long, and it is not preferable when miniaturizing the zoom lens. On the other hand, when the numerical value of the conditional expression (12) is the lower limit value or smaller, since the flange back at the wide-angle end of the zoom lens becomes short, it becomes difficult to secure the flange back requested to the interchangeable lens of the imaging apparatus to which the interchangeable lens system is applied for the zoom lens, and it is not preferable.

When obtaining the above-described effects, it is preferable that the lower limit value of the conditional expression (12) is 1.15, it is more preferable to be 1.20, it is further preferable to be 1.40, and it is furthermore preferable to be 1.80. In addition, it is preferable that the upper limit value of the conditional expression (12) is 3.20, it is more preferable to be 3.00, and it is further preferable to be 2.90.

1-3-13. Conditional Expression (13)

In the zoom lens, it is preferable to satisfy the following conditional expression.

$$-0.30 < fF/ft < -0.05 \quad \text{Conditional expression (13):}$$

Note that fF: the focal length of the focus group.

The conditional expression (13) is the expression that stipulates the ratio between the focal length of the focus group and the focal length of the entire zoom lens at the telephoto end. By satisfying the conditional expression (13), the focal length of the focus group to the focal length of the entire zoom lens at the telephoto end is settled within the appropriate range, the various kinds of aberration such as the axial chromatic aberration and the spherical aberration can be excellently corrected with the smaller number of the lenses, and it becomes easier to realize the high-performance zoom lens in the entire focusing area. Simultaneously with that, the zoom lens can be further miniaturized. In addition, since the moving amount of the focus group during the focusing can be settled within the appropriate range, the quick auto-focusing is realized, and the position control of the focus group can be appropriately performed.

In contrast, when the numerical value of the conditional expression (13) becomes the upper limit value or larger, the focal length of the focus group to the focal length of the entire zoom lens at the telephoto end becomes too short. Therefore, it becomes difficult to correct the various kinds of aberration such as the axial chromatic aberration, the spherical aberration and the Field Curvature when focusing the proximity object, and it becomes difficult to realize the high-performance zoom lens in the entire focusing area with the small number of the lenses. In addition, in this case, since the focus sensitivity of the focus group becomes high, it is needed to highly accurately perform the position control of the focus group for aligning the focusing position, the position control of the focus group becomes difficult, and it is not preferable.

On the other hand, when the numerical value of the conditional expression (13) becomes the lower limit value or smaller, the focal length of the focus group to the focal length of the entire zoom lens at the telephoto end becomes too long. In this case, since the focus sensitivity of the focus group becomes low, the moving amount of the focus group during the focusing becomes large, the entire optical length of the zoom lens becomes long, it becomes difficult to realize the quick auto-focusing, and it is not preferable.

When obtaining the above-described effects, it is preferable that the lower limit value of the conditional expression (13) is −0.25, it is more preferable to be −0.20, and it is further preferable to be −0.18. In addition, it is preferable that the upper limit value of the conditional expression (13) is −0.07, it is more preferable to be −0.09, and it is further preferable to be −0.10.

1-3-14. Conditional Expression (14) and Conditional Expression (15)

In the zoom lens, when the lens having the negative refractive power and satisfying the following conditional expressions is defined as a lens N, it is preferable that at least one lens N is included in or after the third lens group.

$$15.0 < vdN < 42.0 \quad (14)$$

$$1.85 < NdN < 2.15 \quad (15)$$

Note that vdN: the Abbe number in the d line of the lens N, and

NdN: a refractive index in the d line of the lens N.

When at least one of the lenses having the negative refractive power included in or after the third lens group is the lens N of high dispersion and a high refractive index satisfying the conditional expression (14) and the conditional expression (15) described above, since the chromatic aberration generated in the lens having the positive refractive power constituting the first lens group can be offset by the lens N, the axial chromatic aberration at the telephoto end can be reduced. Therefore, the axial chromatic aberration at the telephoto end can be reduced without using the expensive glass material of extremely small dispersion as the glass material of the lens having the positive refractive power constituting the first lens group. Thus, cost increase can be suppressed while realizing the high-performance zoom lens, and it is preferable.

When obtaining the above-described effects, it is preferable that the lower limit value of the conditional expression (14) is 20.0, it is more preferable to be 24.0, it is further preferable to be 25.2, and it is furthermore preferable to be 28.0. In addition, it is preferable that the upper limit value of the conditional expression (14) is 41.0, it is more preferable to be 39.0, and it is further preferable to be 37.5.

When obtaining the above-described effects, it is preferable that the lower limit value of the conditional expression (15) is 1.87, and it is further preferable to be 1.89. In addition, it is preferable that the upper limit value of the conditional expression (15) is 2.05, it is more preferable to be 1.98, and it is further preferable to be 1.95.

In the zoom lens, by including the lens N in the third lens group, since the chromatic aberration generated in the first lens group can be offset in the third lens group, the axial chromatic aberration at the telephoto end can be reduced more and it is preferable. Note that, in the zoom lens, the plurality of lenses N having the negative refractive power satisfying the conditional expression (14) and the conditional expression (15) may be included in or after the third lens group.

2. Imaging Apparatus

Next, the imaging apparatus of the present embodiment will be described. The imaging apparatus of the present embodiment includes the zoom lens, and an image sensor that converts an optical image formed by the zoom lens to an electric signal on the image side of the zoom lens.

In the present invention, the image sensor is not limited in particular, and a solid-state image sensor or the like such as a CCD (Charge Coupled Device) sensor or a CMOS (Complementary metal Oxide Semiconductor) sensor can be used.

In particular, the zoom lens can secure the flange back suitable for the interchangeable lens system such as a single-lens reflex camera or a mirrorless single-lens camera even at the wide-angle end. Thus, the imaging apparatus is suitable for the imaging apparatus to which the interchangeable lens system is applied.

It is preferable that the imaging apparatus includes an image processing unit that electrically processes the optical image (image data) converted to the electric signal by the image sensor, and is constituted so as to execute image processing to the image data by the image processing unit. For example, the optical image obtained when an object is imaged using the zoom lens may include distortion (deviation from an ideal object image) due to the various kinds of aberration of the zoom lens. Then, based on an aberration property of the zoom lens, image correction data for correcting the aberration is prepared, and by electrically processing the image data by the image processing unit using the image correction data, image data for which the distortion of the optical image is corrected can be generated. Note that the imaging apparatus may include a distortion correction data storage unit storing the image correction data beforehand, or may include a data storage unit constituted so as to store the image correction data. In addition, the imaging apparatus may include communication means such as a wireless communication means and a data acquisition unit that acquires the image correction data stored in an external device through the communication means or the like, and electrically process the image data by the image processing unit using the image correction data acquired through the communication means or the like. The specific aspects regarding the image processing are not limited in particular. Note that it is assumed that the ideal object image indicates the optical image obtained when the object is imaged using the lens (zoom lens) without the aberration.

In the case that the imaging apparatus includes the image processing unit and is constituted so as to correct the distortion aberration by the image processing unit using previously prepared data for distortion aberration correction for the distortion of the optical image due to the distortion aberration for example, it is preferable since the negative refractive power arranged more on the image side than the stop can be increased in the zoom lens and the miniaturization can be performed in the entire optical length and the radiation direction of the zoom lens.

In addition, in the case that the imaging apparatus includes the image processing unit and is constituted so as to correct the chromatic aberration of the magnification by the image processing unit using previously prepared data for correcting the chromatic aberration of the magnification for the distortion of the optical image due to the chromatic aberration of the magnification for example, it is preferable since the negative refractive power arranged more on the image side than the stop can be increased in the zoom lens and the miniaturization can be performed in the entire optical length and the radiation direction of the zoom lens.

Next, the present invention will be specifically described indicating examples. Note that the present invention is not limited to the following examples. The zoom lens in each example listed below is the zoom lens (variable magnification optical system) used in the above-described imaging apparatus (optical apparatus), and can be preferably applied to the imaging apparatus to which an interchangeable lens imaging system is applied in particular. In addition, in respective lens sectional views, left facing the drawing is the object side and right is the image side.

Example 1

(1) Construction of Optical System

FIG. 1 is a sectional view illustrating a lens construction when focusing at infinity at the wide-angle end of the zoom lens in the example 1 according to the present invention. The zoom lens is constituted from a first lens group G1 having the positive refractive power, a second lens group G2 having the negative refractive power, a third lens group G3 having the positive refractive power, a fourth lens group G4 having the positive refractive power, a fifth lens group G5 having the negative refractive power, and a sixth lens group G6 having the negative refractive power, in order from the object side. The fifth lens group G5 is the focus group, and is constituted from one lens to be described later. When focusing from the infinity object to a short-distance object, the fifth lens group G5 is moved to the image side along the optical axis. An aperture stop S is arranged on the most image plane side of the third lens group G3. In FIG. 1, "CG" indicates cover glass, a low-pass filter and an infrared filter or the like. "IMG" is the image plane, and indicates an imaging plane of the solid-state image sensor such as the CCD sensor or the CMOS sensor, or a film surface of a silver halide film or the like. The points are similar also in the respective lens sectional view illustrated in the other examples, and the description is omitted below.

Next, the construction of each lens group will be described. The first lens group G1 is constituted from a cemented lens for which a negative meniscus lens L1 in a convex shape on the object side and a biconvex lens L2 are cemented, and a biconvex lens L3, in order from the object side.

The second lens group G2 is constituted from a cemented lens for which a biconcave lens L4 and a positive meniscus lens L5 in the convex shape on the object side are cemented, and a biconcave lens L6, in order from the object side.

The third lens group G3 is constituted from a biconvex lens L7, a cemented lens for which a biconvex lens L8 and a biconcave lens L9 are cemented, a cemented lens for which a biconcave lens L10 and a positive meniscus lens L11 in the convex shape on the object side are cemented, and the aperture stop S, in order from the object side.

The fourth lens group G4 is constituted from a biconvex lens L12, and a cemented lens for which a biconvex lens L13 and a negative meniscus lens L14 in a concave shape on the object side are cemented, in order from the object side.

The fifth lens group G5 is constituted from a negative meniscus lens L15 in the convex shape on the object side.

The sixth lens group G6 is constituted from a cemented lens for which a biconcave lens L16 and a biconvex lens L17 are cemented.

In the zoom lens in the example 1, a track of the movement of each lens group during changing focal length from the wide-angle end to the telephoto end is as illustrated in FIG. 1, the first lens group is moved to the object side, the second lens group is fixed, the third lens group is moved to the object side, the fourth lens group is moved to the object side, the fifth lens group is moved to the object side, and the sixth lens group is also moved to the object side. Note that the tracks (the direction of the movement and the moving amount) of the movement during changing focal length of the fourth lens group and the sixth lens group are the same. The moving amount of the fourth lens group and the sixth lens group and the moving amount of the fifth lens group during changing focal length are slightly different.

Note that, as a modification, for example, even in the case of constituting the fourth lens group to the sixth lens group as one lens group and moving all the lens groups on the same track during changing focal length, the optical performance roughly equal to that of the zoom lens in the example 1 can be obtained, and it is within the scope of the present invention. In this case, in the lens group, the fourth lens group as an object side partial lens group, the focus group (fifth lens group) as the partial lens group, and the sixth lens group as an image side partial lens group are equipped in order from the object side.

In addition, as another modification, for example, even in the case of constituting the third lens group to the sixth lens group as one lens group and moving all the lens groups on the same track during changing focal length, the optical performance roughly equal to that of the zoom lens in the example 1 can be obtained, and it is within the scope of the present invention. In this case, in the lens group, the third lens group and the fourth lens group as the object side partial lens groups, the focus group (fifth lens group) as the partial lens group, and the sixth lens group as the image side partial lens group are equipped in order from the object side.

In addition, the zoom lens in the example 1 can include the vibration-proof lens group that corrects the image blur by making at least one lens constituting the zoom lens in the example 1 eccentric, by moving the lens in a direction orthogonal to the optical axis for example, in the case that the image blur is generated during photographing due to a camera shake or the like. For example, the vibration-proof lens group corrects the image blur on the image plane IMG by moving the cemented lens for which the biconcave lens L10 and the positive meniscus lens L11 in the convex shape on the object side are cemented, included in the third lens group G3, in the direction vertical to the optical axis.

(2) Typical Numerical Values

Next, typical numerical values to which specific numerical values of the zoom lens are applied will be described. Table 1 illustrates surface data of the optical system. In Table 1, "surface number" is an order of the lens surface counted from the object side, "r" indicates the radius of curvature of the lens surface, "d" indicates a space on the optical axis of the lens surface, "Nd" indicates the refractive index to the d line (wavelength λ=587.56 nm), "vd" indicates the Abbe number to the d line, and "H" indicates an effective radius. In addition, "S" attached in a column next to "surface number" indicates the aperture stop. Furthermore, "INF" described in a column of "r" means "∞ (infinite)". Note that a unit of all the lengths in the respective tables is "mm", and the unit of all viewing angles is "°".

Table 2 illustrates element data of the zoom lens. Table 2 illustrates the focal length (f), the F-number (Fno), the half image viewing angle (ω), an image height (Y), and the entire optical length (TL) of the zoom lens at the wide-angle end, the intermediate focal length position and the telephoto end.

Table 3 illustrates a variable interval on the optical axis during changing focal length (note that, it is when focusing at infinity). Table 3 illustrates the space between the respective lens surfaces at the wide-angle end, the intermediate focal length position and the telephoto end, in order from a left side.

Table 4 illustrates the variable interval on the optical axis when focusing the proximity object (photographing distance 3.00 m). Table 4 illustrates the space between the respective lens surfaces at the wide-angle end, the intermediate focal length position and the telephoto end, in order from the left side. Further, Table 5 illustrates the focal lengths of the respective lens groups. In Table 5, "surface number" means the number of the lens surface included in the respective lens groups.

In addition, Table 17 illustrates the numerical values of the respective conditional expression (1)—the conditional expression (15) of the optical system. Since items regarding the respective tables are similar also in the respective tables illustrated in the other examples, the description is omitted below.

Figure 2:
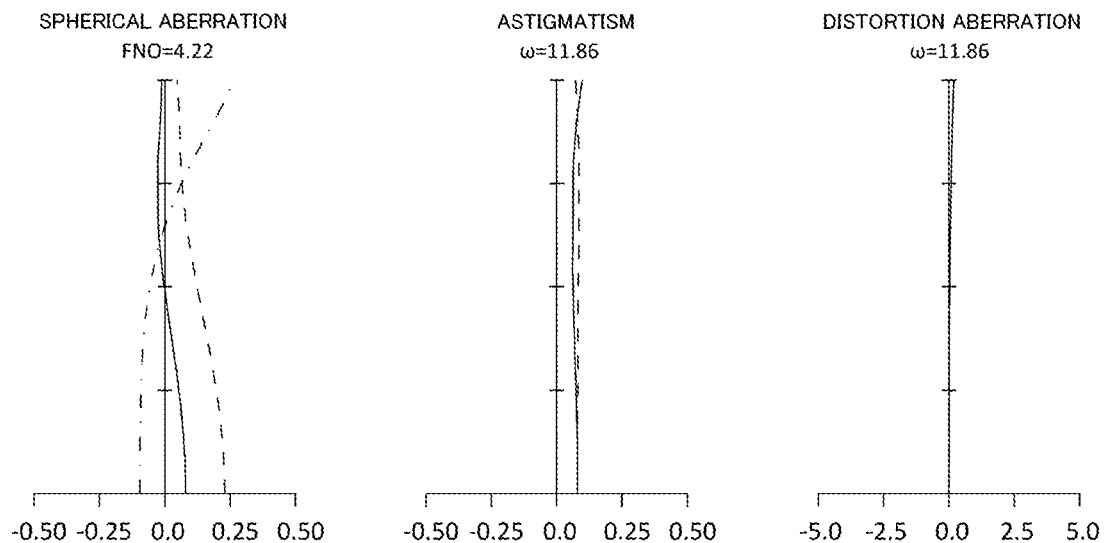
FIG. 2 is a spherical aberration diagram, an astigmatism diagram, and a distortion aberration diagram when focusing at infinity at the wide-angle end of the zoom lens in the example 1.

In addition, FIG. 2 illustrates a longitudinal aberration diagram when focusing at infinity at the wide-angle end of the zoom lens. The spherical aberration, astigmatism and the distortion aberration are illustrated in order from the left side facing the drawing.

In the diagram illustrating the spherical aberration, a vertical axis is a ratio with an open F-number (indicated by FNO in the figure), a horizontal axis is defocus, a solid line indicates the spherical aberration on the d line (wavelength 587.56 nm), a dashed line indicates the spherical aberration on a g line (wavelength 435.84 nm), and a broken line indicates the spherical aberration on a C line (wavelength 656.27 nm).

In the diagram illustrating the astigmatism, the vertical axis indicates the half image viewing angle (ω), the horizontal axis is the defocus, the solid line indicates the astigmatism on a sagittal image plane (S) to the d line (wavelength 587.56 nm), and a dotted line indicates the astigmatism on a meridional image plane (T) to the d line.

In the diagram illustrating the distortion aberration, the vertical axis indicates the half image viewing angle (ω), the horizontal axis is %, and the distortion aberration on the d line (wavelength 587.56 nm) is indicated.

Back focus "fb" when focusing at infinity at the wide-angle end of the zoom lens is as follows. Note that the value below is the value not including the cover glass (Nd=1.5168) with a thickness of 2.5 mm, and it is similar for the back focus illustrated in the other examples.

$fb=44.319$ (mm)

Figure 3:
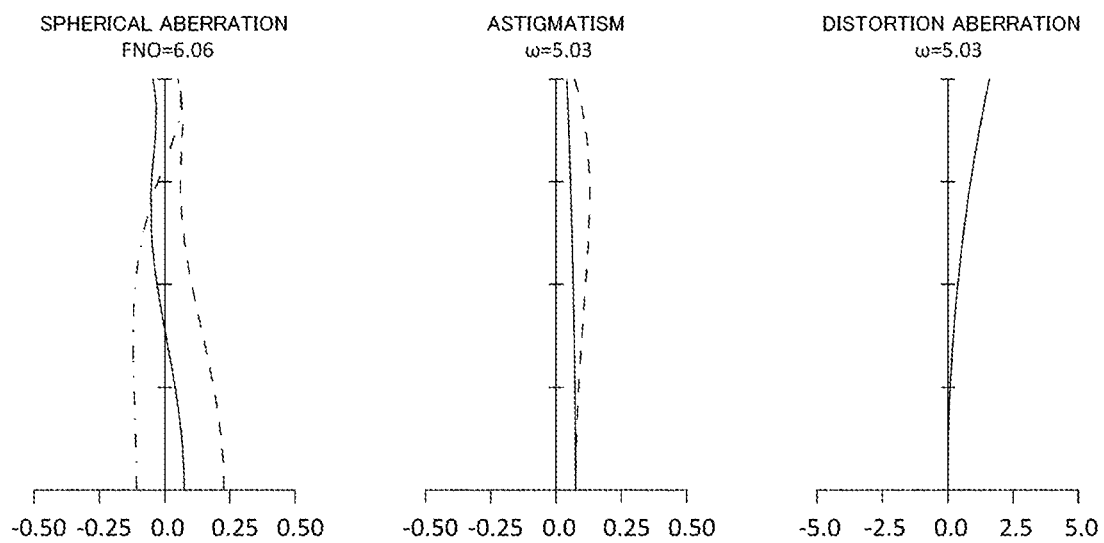
FIG. 3 is a spherical aberration diagram, an astigmatism diagram, and a distortion aberration diagram when focusing at infinity at an intermediate focal length position of the zoom lens in the example 1.
Figure 4:
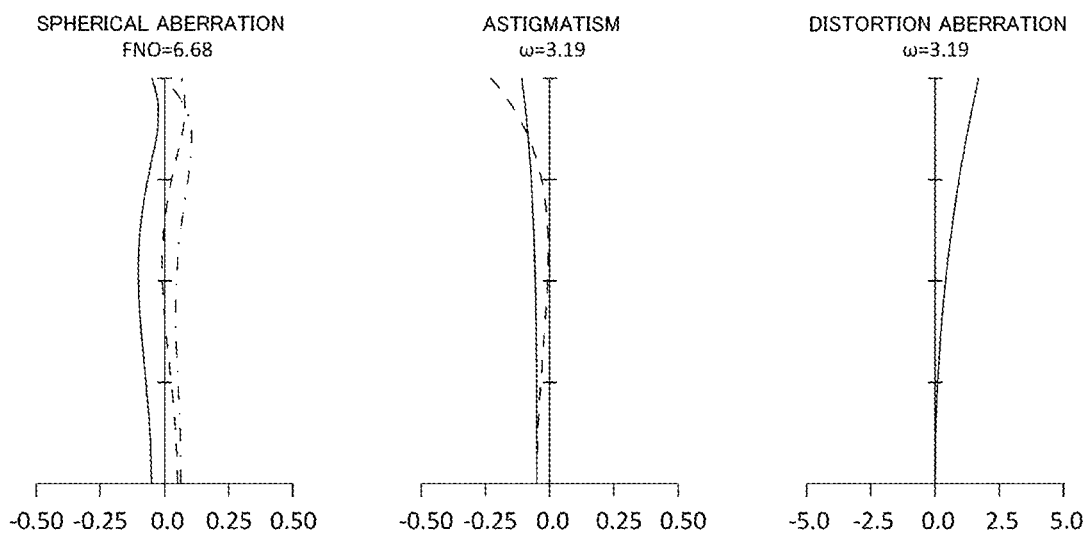
FIG. 4 is a spherical aberration diagram, an astigmatism diagram, and a distortion aberration diagram when focusing at infinity at a telephoto end of the zoom lens in the example 1.

In addition, FIG. 3 illustrates a spherical aberration diagram, an astigmatism diagram, and a distortion aberration diagram when focusing at infinity at the intermediate focal length position of the zoom lens, and FIG. 4 illustrates a spherical aberration diagram, an astigmatism diagram, and a distortion aberration diagram when focusing at infinity at the telephoto end of the zoom lens. The items regarding the aberration diagrams described in FIG. 2 are similar in FIG. 3 and FIG. 4, and are similar also in the respective diagrams illustrated in the other examples. Thus, the description is omitted below.

TABLE 1

| Surface number | | r | d | Nd | vd | H |
|---|---|---|---|---|---|---|
| 1 | | 368.1314 | 2.000 | 1.83400 | 37.34 | 31.190 |
| 2 | | 133.4489 | 0.020 | 1.56732 | 42.84 | 30.907 |
| 3 | | 133.4489 | 5.347 | 1.49700 | 81.61 | 30.574 |
| 4 | | −1204.8193 | 0.250 | | | 30.574 |
| 5 | | 142.1182 | 5.404 | 1.48749 | 70.44 | 30.420 |
| 6 | | −588.8881 | D6 | | | 30.548 |
| 7 | | −364.0644 | 1.300 | 1.75859 | 40.71 | 30.448 |
| 8 | | 30.4459 | 0.010 | 1.56732 | 42.84 | 15.859 |
| 9 | | 30.4459 | 3.900 | 1.80518 | 25.46 | 15.207 |
| 10 | | 128.0739 | 2.585 | | | 15.207 |
| 11 | | −85.3484 | 1.250 | 1.64813 | 59.10 | 15.153 |
| 12 | | 308.6179 | D12 | | | 15.140 |
| 13 | | 67.3877 | 4.760 | 1.49700 | 81.61 | 15.284 |
| 14 | | −67.3877 | 0.480 | | | 15.831 |
| 15 | | 48.6976 | 5.580 | 1.48749 | 70.44 | 15.740 |
| 16 | | −54.6296 | 0.010 | 1.56732 | 42.84 | 15.167 |
| 17 | | −54.6296 | 1.205 | 1.91034 | 34.96 | 14.956 |
| 18 | | 2993.4569 | 12.490 | | | 14.954 |
| 19 | | −236.8320 | 1.010 | 1.64627 | 53.55 | 14.674 |
| 20 | | 26.0845 | 0.010 | 1.56732 | 42.84 | 13.718 |
| 21 | | 26.0845 | 2.920 | 1.80610 | 33.27 | 13.358 |
| 22 | | 54.7403 | 5.000 | | | 13.357 |
| 23 | S | INF | D23 | | | 13.257 |
| 24 | | 82.4222 | 4.030 | 1.51457 | 58.39 | 12.230 |
| 25 | | −46.8823 | 0.400 | | | 12.427 |
| 26 | | 45.2941 | 4.810 | 1.53299 | 67.41 | 12.365 |
| 27 | | −40.4851 | 0.010 | 1.56732 | 42.84 | 11.500 |
| 28 | | −40.4851 | 1.100 | 1.90222 | 35.10 | 11.348 |
| 29 | | −520.4612 | D29 | | | 11.347 |
| 30 | | 89.9220 | 1.000 | 1.77841 | 48.98 | 11.303 |
| 31 | | 31.4119 | D31 | | | 10.681 |
| 32 | | −32.4576 | 1.110 | 1.49506 | 69.88 | 10.501 |
| 33 | | 39.7392 | 0.010 | 1.56732 | 42.84 | 11.119 |
| 34 | | 39.7392 | 4.040 | 1.65274 | 33.01 | 12.144 |

TABLE 1-continued

| Surface number | r | d | Nd | vd | H |
|---|---|---|---|---|---|
| 35 | −182.1743 | D35 | | | 12.146 |
| 36 | INF | 2.000 | 1.5168 | 64.2 | 12.406 |
| 37 | INF | 1.000 | | | 21.591 |

TABLE 2

| | | | |
|---|---|---|---|
| f | 103.000 | 245.960 | 388.525 |
| Fno | 4.222 | 6.034 | 6.603 |
| ω | 11.852 | 4.954 | 3.134 |
| Y | 21.630 | 21.630 | 21.630 |
| TL | 236.625 | 279.757 | 306.635 |

TABLE 3

| | | | |
|---|---|---|---|
| f | 103.000 | 245.960 | 388.525 |
| Photographing distance | INF | INF | INF |
| D6 | 35.150 | 78.282 | 105.160 |
| D12 | 47.907 | 17.658 | 2.978 |
| D23 | 17.585 | 14.019 | 16.466 |
| D29 | 10.429 | 8.019 | 4.818 |
| D31 | 8.513 | 10.923 | 14.124 |
| D35 | 42.000 | 75.816 | 88.049 |

TABLE 4

| | | | |
|---|---|---|---|
| Photographing distance | 3000.00 | 3000.00 | 3000.00 |
| D29 | 11.498 | 10.784 | 10.096 |
| D31 | 7.444 | 8.158 | 8.846 |

TABLE 5

| Group | Surface number | Focal length |
|---|---|---|
| G1 | 1-6 | 227.344 |
| G2 | 7-12 | −59.626 |
| G3 | 13-23 | 96.373 |
| G4 | 24-29 | 45.5443 |
| G5 | 30-31 | −62.4856 |
| G6 | 32-35 | −133.031 |

Example 2

(1) Construction of Optical System

Figure 5:
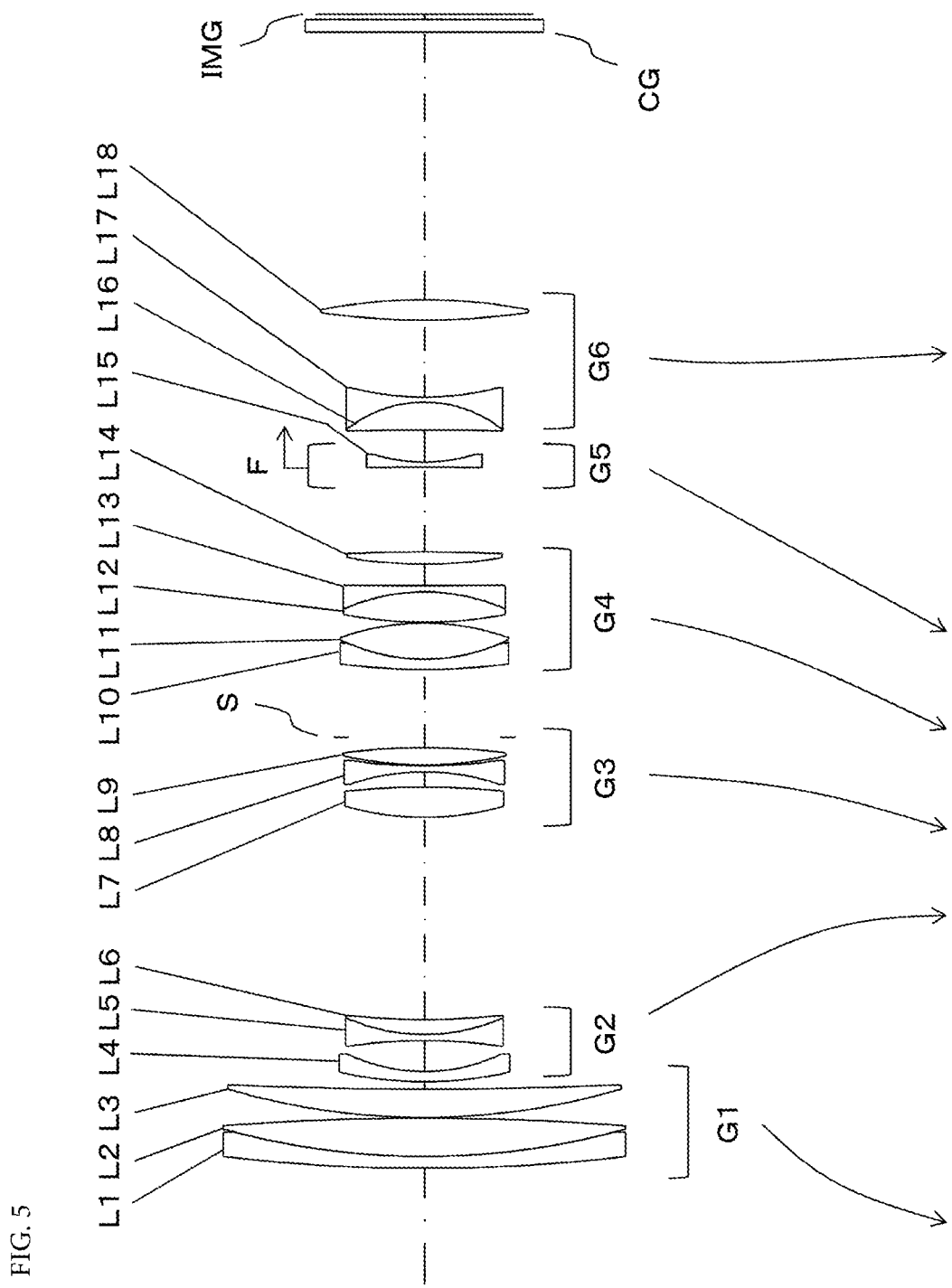
FIG. 5 is a sectional view illustrating a lens construction example when focusing at infinity at a wide-angle end of a zoom lens in an example 2 of the present invention.

FIG. 5 is a sectional view illustrating the lens construction when focusing at infinity at the wide-angle end of the zoom lens in the example 2 according to the present invention. The zoom lens is constituted from the first lens group G1 having the positive refractive power, the second lens group G2 having the negative refractive power, the third lens group G3 having the positive refractive power, the fourth lens group G4 having the positive refractive power, the fifth lens group G5 having the negative refractive power, and the sixth lens group G6 having the positive refractive power, in order from the object side. The fifth lens group G5 is the focus group, and is constituted from one lens to be described later. When focusing from the infinity object to the short-distance object, the fifth lens group G5 is moved to the image side along the optical axis. The aperture stop S is arranged on the most image plane side of the third lens group G3.

Next, the construction of each lens group will be described. The first lens group G1 is constituted from the cemented lens for which the negative meniscus lens L1 in the convex shape on the object side and the biconvex lens L2 are cemented, and a positive meniscus lens L3 in the convex shape on the object side, in order from the object side.

The second lens group G2 is constituted from a negative meniscus lens L4 in the convex shape on the object side, and a cemented lens for which a biconcave lens L5 and a positive meniscus lens L6 in the convex shape on the object side are cemented, in order from the object side.

The third lens group G3 is constituted from the biconvex lens L7, a biconcave lens L8, a biconvex lens L9, and the aperture stop S, in order from the object side.

The fourth lens group G4 is constituted from a cemented lens for which a negative meniscus lens L10 in the convex shape on the object side and a biconvex lens L11 are cemented, a cemented lens for which the biconvex lens L12 and a negative meniscus lens L13 in the concave shape on the object side are cemented, and a biconvex lens L14, in order from the object side.

The fifth lens group G5 is constituted from a biconcave lens L15, both surfaces of which are aspherical surfaces.

The sixth lens group G6 is constituted from a cemented lens for which a positive meniscus lens L16 in the concave shape on the object side and a biconcave lens L17 are cemented, and a biconvex lens L18.

In the zoom lens in the example 2, the track of the movement of each lens group during changing focal length from the wide-angle end to the telephoto end is as illustrated in FIG. 5, the first lens group is moved to the object side, the second lens group is moved to the image side, the third lens group is moved to the object side, the fourth lens group is moved to the object side, the fifth lens group is moved to the object side, and the sixth lens group is also moved to the object side and is then moved to the image side. In the zoom lens in the example 2, all the lens groups are the movable groups, but the moving amount of the sixth lens group is slight. Therefore, even when the sixth lens group arranged on the most image side is made to be the fixed group, the optical performance equal to that of the zoom lens in the example 2 can be obtained, and it is within the scope of the present invention.

In addition, the zoom lens in the example 2 can also include the vibration-proof lens group that corrects the image blur by making at least one lens constituting the zoom lens in the example 2 eccentric, by moving the lens in the direction orthogonal to the optical axis for example, in the case that the image blur is generated during photographing due to a camera shake or the like. For example, the vibration-proof lens group corrects the image blur on the image plane IMG by moving the second lens group G2 in the direction vertical to the optical axis.

(2) Typical Numerical Values

Next, the typical numerical values to which the specific numerical values of the zoom lens are applied will be described. Table 6 illustrates the surface data of the zoom lens, Table 7 illustrates the element data, Table 8 illustrates the variable interval on the optical axis during changing focal length, Table 9 illustrates the variable interval on the optical axis during the focusing (note that, the photographing distance is 0.70 m), Table 10 illustrates the focal lengths of the respective lens groups, and Table 17 illustrates the numerical values of the respective conditional expression (1)—the conditional expression (15) of the zoom lens.

Note that, in Table 6, "ASP" attached to the column next to the surface number indicates that the lens surface is the aspherical surface, and the aspherical surface data is illustrated in Table 11. In Table 11, the aspherical surface data indicates an aspherical surface coefficient when the aspherical surface shape is defined by the following expression. Note that, in Table 11, "E-a" indicates "×10$^{-a}$". The aspherical surface data indicates a constant of the cone and the aspherical surface coefficients of respective orders when the aspherical surface is defined by the following expression.

$$x = \frac{rH^2}{1+\sqrt{1-(1+k)r^2H^2}} + A4H^4 + A6H^6 + A8H^8 + A10H^{10}$$ [Expression 1]

Note that, in the above-described expression, "x" is a displacement amount from a reference surface in the optical axis direction (the image plane side is defined as positive), "r" is a paraxial radius of curvature, "H" is a height from the optical axis in the direction vertical to the optical axis, "k" is the constant of the cone, and "An" is the aspherical surface coefficient of an n-order respectively (note that n=4, 6, 8, 10).

Figure 6:
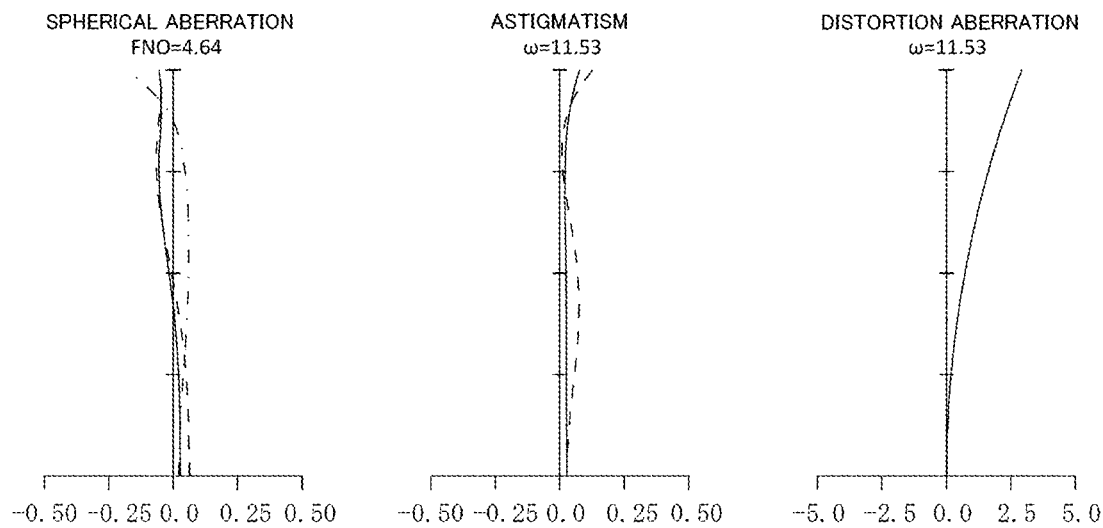
FIG. 6 is a spherical aberration diagram, an astigmatism diagram, and a distortion aberration diagram when focusing at infinity at the wide-angle end of the zoom lens in the example 2.
Figure 7:
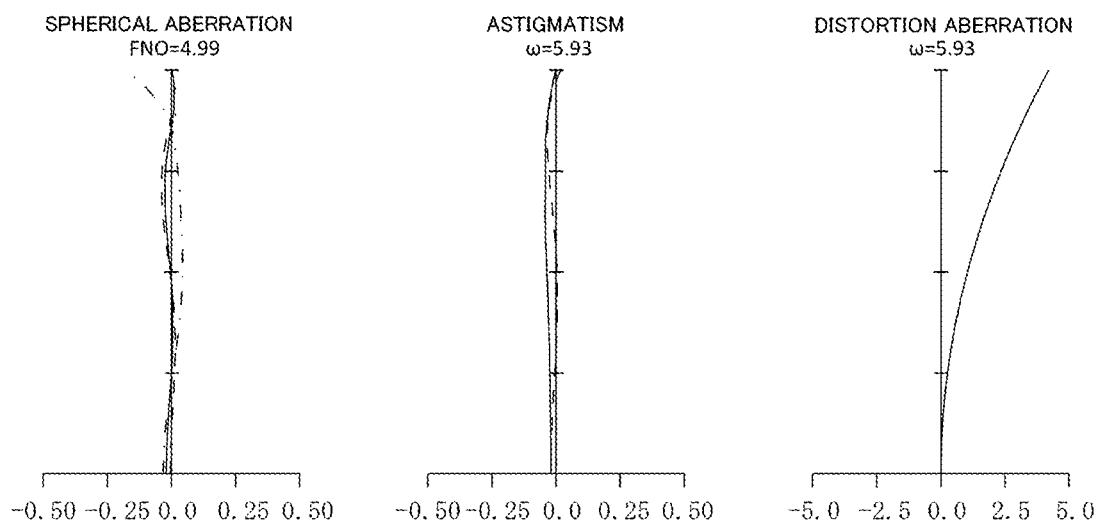
FIG. 7 is a spherical aberration diagram, an astigmatism diagram, and a distortion aberration diagram when focusing at infinity at an intermediate focal length position of the zoom lens in the example 2.
Figure 8:
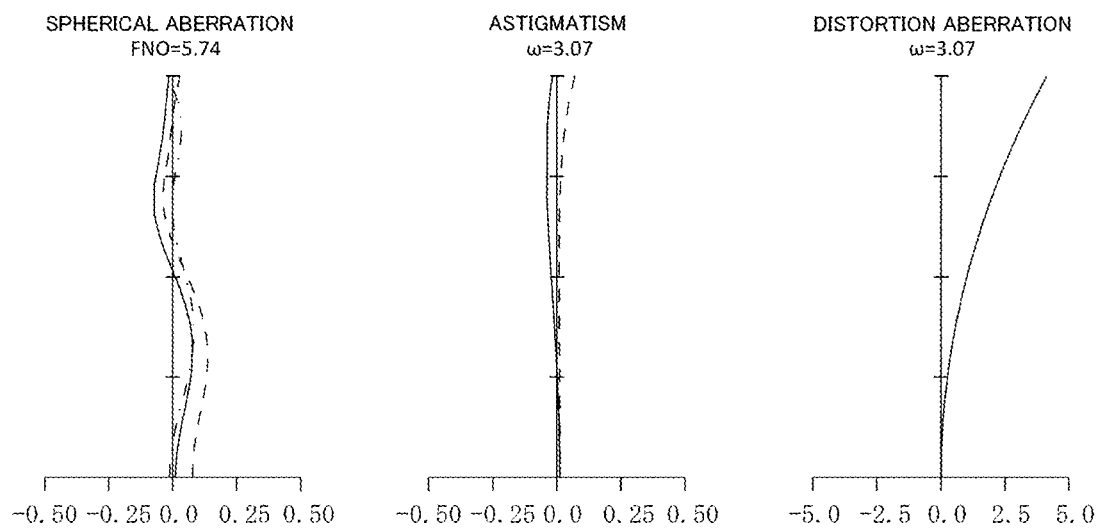
FIG. 8 is a spherical aberration diagram, an astigmatism diagram, and a distortion aberration diagram when focusing at infinity at a telephoto end of the zoom lens in the example 2.

In addition, FIG. 6 illustrates a longitudinal aberration diagram when focusing at infinity at the wide-angle end of the zoom lens, FIG. 7 illustrates a longitudinal aberration diagram when focusing at infinity at the intermediate focal length position, and FIG. 8 illustrates a longitudinal aberration diagram when focusing at infinity at the telephoto end.

The back focus "fb" when focusing at infinity at the wide-angle end of the zoom lens is as follows.

$fb$=54.863 (mm)

TABLE 6

| Surface number | r | d | Nd | vd | H |
|---|---|---|---|---|---|
| 1 | 331.8617 | 2.300 | 1.74778 | 42.64 | 37.000 |
| 2 | 143.7963 | 7.459 | 1.49700 | 81.61 | 36.712 |
| 3 | −511.5875 | 0.150 | | | 36.680 |
| 4 | 133.3686 | 5.522 | 1.49700 | 81.61 | 36.220 |
| 5 | 864.2223 | D5 | | | 36.043 |
| 6 | 73.5903 | 2.000 | 1.68799 | 34.04 | 15.264 |
| 7 | 34.3968 | 6.000 | | | 14.345 |
| 8 | −101.7094 | 1.200 | 1.48749 | 70.44 | 14.098 |
| 9 | 36.9392 | 2.929 | 1.82698 | 32.87 | 13.898 |
| 10 | 137.1543 | D10 | | | 13.800 |
| 11 | 55.1657 | 5.864 | 1.49700 | 81.61 | 14.200 |
| 12 | −159.0121 | 3.000 | | | 14.065 |
| 13 | −44.2705 | 1.200 | 1.88069 | 40.16 | 13.920 |
| 14 | 103.4192 | 0.150 | | | 14.364 |
| 15 | 70.4741 | 3.350 | 1.92286 | 20.88 | 14.591 |
| 16 | −124.2983 | 2.000 | | | 14.648 |
| 17 | S INF | D17 | | | 14.660 |
| 18 | 127.2753 | 2.000 | 1.89141 | 31.85 | 15.090 |
| 19 | 36.6111 | 7.041 | 1.59154 | 64.26 | 14.944 |
| 20 | −47.6417 | 0.150 | | | 15.009 |
| 21 | 81.0387 | 5.919 | 1.56484 | 62.66 | 14.521 |
| 22 | −38.2957 | 1.200 | 1.92286 | 20.88 | 14.254 |
| 23 | 1578.2131 | 4.209 | | | 14.111 |
| 24 | 89.8703 | 2.349 | 1.92286 | 20.88 | 13.883 |
| 25 | −360.2695 | D25 | | | 13.800 |
| 26 | ASP26.8270 | 1.000 | 1.70235 | 56.58 | 10.197 |
| 27 | ASP33.1365 | D27 | | | 9.800 |
| 28 | −854.8457 | 5.439 | 1.80057 | 31.84 | 13.500 |
| 29 | −23.9434 | 1.000 | 1.76062 | 36.32 | 13.592 |
| 30 | 56.6078 | 15.000 | | | 13.987 |
| 31 | 137.5421 | 3.993 | 1.77691 | 28.55 | 18.631 |
| 32 | −102.8241 | D32 | | | 18.741 |
| 33 | INF | 2.500 | 1.51680 | 64.20 | 21.507 |
| 34 | INF | 1.000 | | | 21.591 |

TABLE 7

| f | 103.035 | 199.923 | 387.907 |
|---|---|---|---|
| Fno | 4.637 | 4.993 | 5.737 |
| ω | 11.532 | 5.928 | 3.066 |
| Y | 21.630 | 21.630 | 21.630 |
| TL | 225.000 | 275.155 | 320.000 |

TABLE 8

| f | 103.035 | 199.923 | 387.907 |
|---|---|---|---|
| Photographing distance | INF | INF | INF |
| D5 | 1.439 | 69.834 | 118.575 |
| D10 | 39.394 | 17.917 | 1.000 |
| D17 | 13.262 | 8.491 | 4.125 |
| D25 | 16.551 | 11.937 | 1.000 |
| D27 | 6.212 | 18.063 | 47.126 |
| D32 | 52.219 | 52.988 | 52.251 |

TABLE 9

| Photographing distance | 700.00 | 700.00 | 700.00 |
|---|---|---|---|
| D25 | 20.236 | 22.029 | 23.603 |
| D27 | 2.528 | 7.972 | 24.523 |

TABLE 10

| Group | Surface number | Focal length |
|---|---|---|
| G1 | 1-5 | 216.223 |
| G2 | 6-10 | −82.218 |
| G3 | 11-17 | 207.498 |
| G4 | 18-25 | 49.3299 |
| G5 | 26-27 | −45.5313 |
| G6 | 28-32 | 319.753 |

TABLE 11

| | 26 | 27 |
|---|---|---|
| K | 0 | 4.794240822 |
| A4 | −5.94737E−07 | −1.76420E−05 |
| A6 | 1.51937E−08 | −5.97748E−08 |
| A8 | −1.34613E−10 | 5.99648E−11 |
| A10 | 3.92040E−13 | −2.65788E−12 |

Example 3

(1) Construction of Optical System

Figure 9:
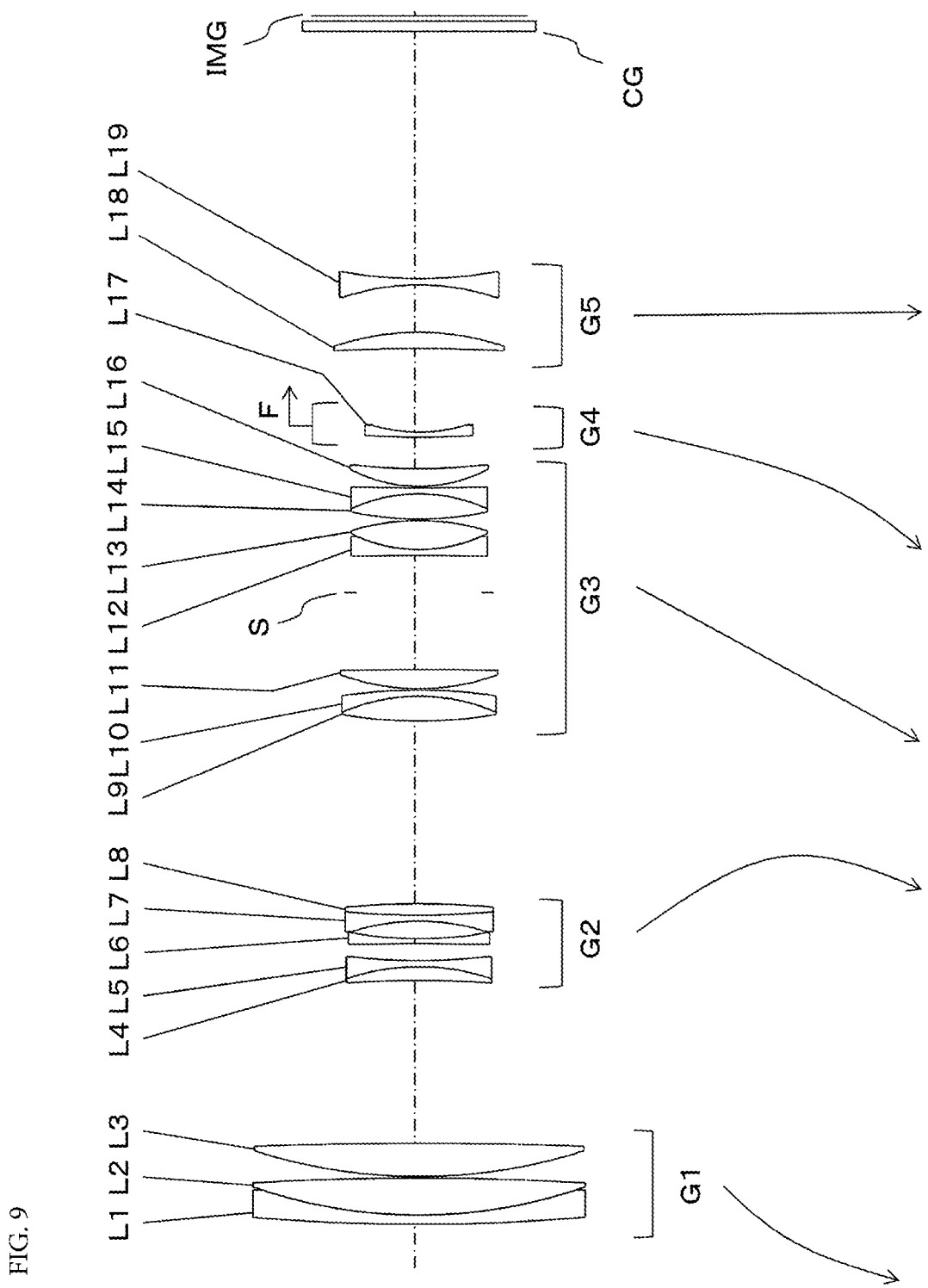
FIG. 9 is a sectional view illustrating a lens construction example when focusing at infinity at a wide-angle end of a zoom lens in an example 3 of the present invention.

FIG. 9 is a sectional view illustrating the lens construction when focusing at infinity at the wide-angle end of the zoom lens in the example 3 according to the present invention. The zoom lens is constituted from the first lens group G1 having the positive refractive power, the second lens group G2 having the negative refractive power, the third lens group G3 having the positive refractive power, the fourth lens group G4 having the negative refractive power, and the fifth lens group G5 having the negative refractive power, in order from the object side. The fourth lens group G4 is the focus group, and is constituted from one lens. When focusing from the infinity object to the short-distance object, the fourth lens group G4 is moved to the image side along the optical axis. The aperture stop S is arranged in the third lens group G3.

The first lens group G1 is constituted from the cemented lens for which the negative meniscus lens L1 in the convex shape on the object side and the biconvex lens L2 are cemented, and the biconvex lens L3, in order from the object side.

The second lens group G2 is constituted from a cemented lens for which a positive meniscus lens L4 in the convex shape on the image side and the biconcave lens L5 are cemented, a biconcave lens L6, and a cemented lens for which the biconvex lens L7 and the biconcave lens L8 are cemented, in order from the object side.

The third lens group G3 is constituted from a cemented lens for which the biconvex lens L9 and the negative meniscus lens L10 in the convex shape on the object side are cemented, the biconvex lens L11, the aperture stop S, a cemented lens for which a biconcave lens L12 and the biconvex lens L13 are cemented, a cemented lens for which the biconvex lens L14 and the biconcave lens L15 are cemented, and the positive meniscus lens L16 in the convex shape on the object side, in order from the object side.

The fourth lens group G4 is constituted from a negative meniscus lens L17 in the convex shape on the object side.

The fifth lens group G5 is constituted from a positive meniscus lens L18 in the concave shape on the object side, and a biconcave lens L19.

In the zoom lens in the example 3, the track of the movement of each lens group during changing focal length from the wide-angle end to the telephoto end is as illustrated in FIG. 9, the first lens group is moved to the object side, the second lens group is moved to the image side and then moved to the object side, the third lens group is moved to the object side, the fourth lens group is moved to the object side, and the fifth lens group fixed.

In addition, the zoom lens in the example 3 can also include the vibration-proof lens group that corrects the image blur by making at least one lens constituting the zoom lens in the example 3 eccentric, by moving the lens in the direction orthogonal to the optical axis for example, in the case that the image blur is generated during photographing due to a camera shake or the like. For example, the vibration-proof lens group corrects the image blur on the image plane IMG by moving three lenses that are the biconcave lens L6 and the cemented lens for which the biconcave lens L7 and the biconvex lens L8 are cemented in the direction vertical to the optical axis.

(2) Typical Numerical Values

Next, the typical numerical values to which the specific numerical values of the zoom lens are applied will be described. Table 12 illustrates the surface data of the zoom lens, Table 13 illustrates the element data, Table 14 illustrates the variable interval on the optical axis during changing focal length, Table 15 illustrates the variable interval on the optical axis during the focusing (note that, the photographing distance is 1.50 m), Table 16 illustrates the focal lengths of the respective lens groups, and Table 17 illustrates the numerical values of the respective conditional expression (1)—the conditional expression (15) of the zoom lens.

Figure 10:
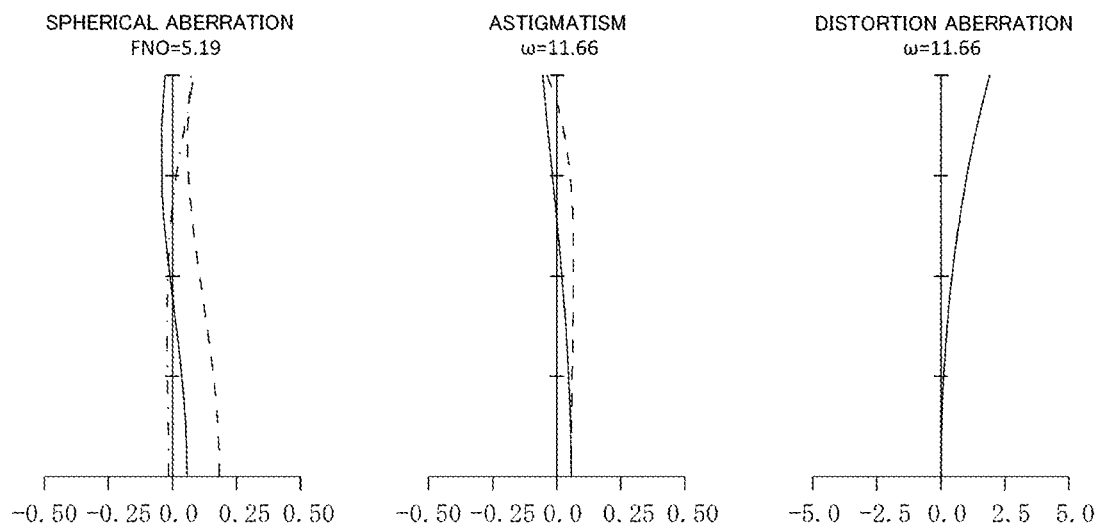
FIG. 10 is a spherical aberration diagram, an astigmatism diagram, and a distortion aberration diagram when focusing at infinity at the wide-angle end of the zoom lens in the example 3.
Figure 11:
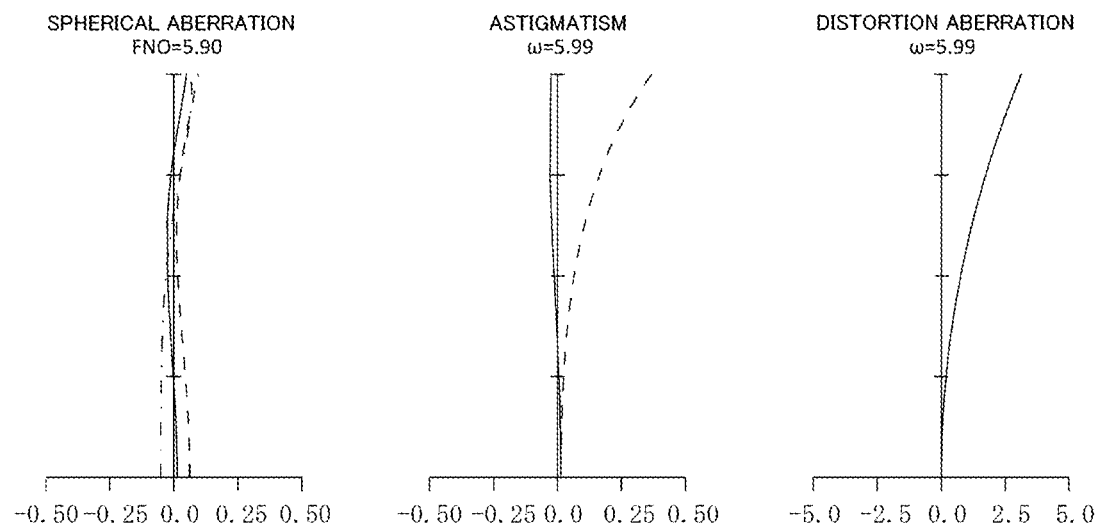
FIG. 11 is a spherical aberration diagram, an astigmatism diagram, and a distortion aberration diagram when focusing at infinity at an intermediate focal length position of the zoom lens in the example 3.
Figure 12:
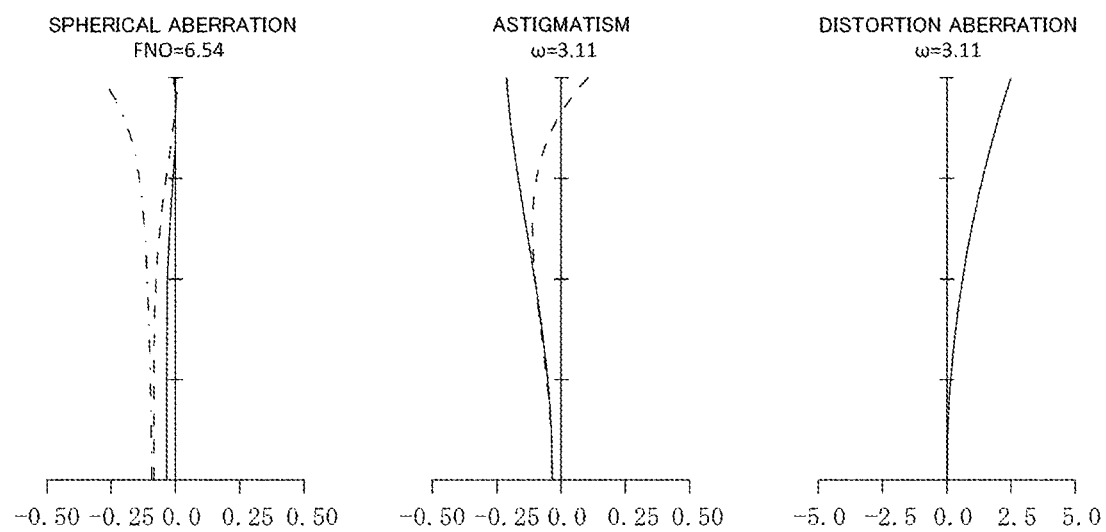
FIG. 12 is a spherical aberration diagram, an astigmatism diagram, and a distortion aberration diagram when focusing at infinity at a telephoto end of the zoom lens in the example 3.

In addition, FIG. 10 illustrates a longitudinal aberration diagram when focusing at infinity at the wide-angle end of the zoom lens, FIG. 11 illustrates a longitudinal aberration diagram when focusing at infinity at the intermediate focal length position, and FIG. 12 illustrates a longitudinal aberration diagram when focusing at infinity at the telephoto end.

The back focus "fb" when focusing at infinity at the wide-angle end of the zoom lens is as follows.

$fb$=51.319 (mm)

TABLE 12

| Surface number | | r | d | Nd | vd | H |
|---|---|---|---|---|---|---|
| 1 | | 386.9477 | 1.800 | 1.77250 | 49.62 | 30.900 |
| 2 | | 97.6787 | 7.321 | 1.49700 | 81.61 | 30.687 |
| 3 | | −550.8558 | 0.300 | | | 30.708 |
| 4 | | 105.5622 | 6.567 | 1.49700 | 81.61 | 30.668 |
| 5 | | −871.1075 | D5 | | | 30.513 |
| 6 | | −193.0458 | 2.721 | 1.83400 | 37.34 | 13.150 |
| 7 | | −43.3651 | 1.200 | 1.69680 | 55.46 | 13.045 |
| 8 | | 115.3300 | 3.321 | | | 12.657 |
| 9 | | −652.8259 | 1.000 | 1.69680 | 55.46 | 12.800 |
| 10 | | 74.7221 | 3.451 | | | 12.719 |
| 11 | | −44.0111 | 1.200 | 1.51680 | 64.20 | 12.747 |
| 12 | | 156.1033 | 2.247 | 1.74077 | 27.76 | 13.260 |
| 13 | | −156.1033 | D13 | | | 13.382 |
| 14 | | 89.7936 | 4.889 | 1.51680 | 64.20 | 13.600 |
| 15 | | −37.5386 | 1.200 | 1.95375 | 32.32 | 13.649 |
| 16 | | −103.9558 | 0.300 | | | 13.963 |
| 17 | | 44.9129 | 3.740 | 1.60342 | 38.01 | 14.313 |
| 18 | | −1026.9539 | 15.254 | | | 14.200 |
| 19 | S | INF | 7.274 | | | 12.259 |
| 20 | | −946.2941 | 1.200 | 1.90366 | 31.31 | 12.331 |
| 21 | | 29.8497 | 5.717 | 1.48749 | 70.44 | 12.184 |
| 22 | | −45.4929 | 0.300 | | | 12.295 |
| 23 | | 64.9500 | 4.965 | 1.71736 | 29.50 | 12.290 |
| 24 | | −31.7770 | 1.200 | 1.91082 | 35.25 | 12.223 |
| 25 | | 462.1784 | 0.301 | | | 12.214 |
| 26 | | 28.6878 | 3.493 | 1.48749 | 70.44 | 12.271 |
| 27 | | 113.9975 | D27 | | | 12.500 |
| 28 | | 179.4149 | 1.000 | 1.69680 | 55.46 | 9.667 |
| 29 | | 31.5641 | D29 | | | 9.400 |
| 30 | | −275.4039 | 3.170 | 1.90366 | 31.31 | 15.407 |
| 31 | | −51.4508 | 9.383 | | | 15.510 |
| 32 | | −46.1574 | 1.200 | 1.51680 | 64.20 | 14.332 |
| 33 | | 82.6773 | 49.000 | | | 14.482 |
| 34 | | INF | 2.000 | 1.51680 | 64.20 | 21.303 |
| 35 | | INF | 1.000 | | | 21.490 |

TABLE 13

| f | 102.923 | 200.000 | 388.001 |
|---|---|---|---|
| Fno | 5.190 | 5.896 | 6.540 |
| ω | 11.662 | 5.988 | 3.113 |
| Y | 21.630 | 21.630 | 21.630 |
| TL | 238.680 | 261.949 | 308.268 |

TABLE 14

| f | 102.923 | 200.000 | 388.001 |
|---|---|---|---|
| Photographing distance | INF | INF | INF |
| D5 | 32.033 | 63.862 | 101.280 |
| D13 | 36.192 | 11.886 | 2.000 |
| D27 | 6.214 | 11.324 | 2.184 |
| D29 | 16.524 | 27.160 | 55.087 |

TABLE 15

| Photographing distance | 1500.00 | 1500.00 | 1500.00 |
|---|---|---|---|
| D27 | 7.659 | 16.067 | 14.548 |
| D29 | 15.079 | 22.417 | 42.723 |

TABLE 16

| Group | Surface number | Focal length |
|---|---|---|
| G1 | 1-5 | 186.479 |
| G2 | 6-13 | −42.084 |
| G3 | 14-27 | 44.917 |
| G4 | 18-29 | −55.1222 |
| G5 | 30-33 | −1269.99 |

TABLE 17

| | | Example 1 | Example 2 | Example 3 |
|---|---|---|---|---|
| Conditional expression (1) | β3rw | −0.946 | −0.713 | −1.365 |
| Conditional expression (2) | f1/√(fw × ft) | 1.136 | 1.082 | 0.933 |
| Conditional expression (3) | Crfr/ft | 0.081 | 0.085 | 0.081 |
| Conditional expression (4) | vdLn | 48.98 | 56.58 | 55.46 |
| Conditional expression (5) | (Crff + Crfr)/(Crff − Crfr) | 2.074 | 0.931 | 1.427 |
| Conditional expression (6) | f1/ft | 0.585 | 0.557 | 0.481 |
| Conditional expression (7) | {1 − (βft × βft)} × βftr × βftr | −9.818 | −11.232 | −8.822 |
| Conditional expression (8) | |X1|/ft | 0.180 | 0.245 | 0.179 |
| Conditional expression (9) | f1/fw | 2.207 | 2.099 | 1.812 |
| Conditional expression (10) | vd1pave | 76.03 | 81.61 | 81.61 |
| Conditional expression (11) | |β2t| | 1.086 | 12.536 | 1.21 |
| Conditional expression (12) | Bfw/(fw × tanωw) | 2.050 | 2.610 | 2.416 |
| Conditional expression (13) | fF/ft | −0.161 | −0.117 | 0.142 |
| Conditional expression (14) | vdN | 34.96 | 20.88 | 32.32 |
| Conditional expression (15) | NdN | 1.910 | 1.923 | 1.954 |

According to the present invention, it is possible to provide the telephoto system zoom lens capable of reducing the weight of the focus group and securing the flange back suitable for the interchangeable lens while maintaining the high optical performance, and the imaging apparatus.

What is claimed is:

1. A zoom lens comprising a first lens group having positive refractive power, a second lens group having negative refractive power, and a third lens group having positive refractive power in order from an object side, and changing focal length by changing an air interval between the respective lens groups, the zoom lens:
   comprising a focus group constituted from one lens in or after the third lens group;
   moving only the focus group along an optical axis direction when focusing from an infinity object to a proximity object; and
   satisfying the following conditional expressions:

$$-1.60 < \beta 33rw < -0.35 \tag{1}$$

$$0.75 < f1/\sqrt{(fw \times ft)} < 1.25 \tag{2}$$

$$0.02 < Crfr/ft < 0.11 \tag{3}$$

wherein
   β3rw: a composite lateral magnification of all lenses arranged from a lens most on the object side in the third lens group to a lens most on an image side in the zoom lens when focusing at infinity at a wide-angle end,
   f1: a focal length of the first lens group,
   fw: a focal length of an entire zoom lens at the wide-angle end,
   ft: a focal length of the entire zoom lens at a telephoto end, and
   Crfr: a radius of curvature of a lens surface most on an image side in the focus group.

2. The zoom lens according to claim 1, wherein the focus group is constituted from one lens having negative refractive power,
   the zoom lens satisfying the following conditional expression:

$$40.0 < vdLfn \tag{4}$$

wherein
   vdLfn: an Abbe number in a d line of the lens having the negative refractive power constituting the focus group.

3. The zoom lens according to claim 1, wherein the focus group is arranged at an air interval on an image side of a lens group or a partial lens group having the positive refractive power.

4. The zoom lens according to claim 1, wherein the zoom lens satisfies the following conditional expression:

$$-0.25 < (Crff+Crfr)/(Crff-Crfr) < 5.00 \tag{5}$$

wherein
   Crff: a radius of curvature of a lens surface most on an object side in the focus group, and
   Crfr: a radius of curvature of a lens surface most on an image side in the focus group.

5. The zoom lens according to claim 1, wherein the zoom lens satisfies the following conditional expression:

$$0.39 < f1/ft < 0.70. \tag{6}$$

6. The zoom lens according to claim 1, wherein the zoom lens satisfies the following conditional expression:

$$-150.0 < \{1-(\beta ft \times \beta ft)\} \times \beta ftr \times \beta ftr < -5.5 \tag{7}$$

wherein
   βft: a lateral magnification when focusing at infinity at the telephoto end of the focus group, and
   βftr: a composite lateral magnification of the entire lens group arranged more on the image side than the focus group when focusing at infinity at the telephoto end.

7. The zoom lens according to claim 1, wherein the first lens group moves to the object side during changing focal length from the wide-angle end to the telephoto end.

8. The zoom lens according to claim 7, wherein the zoom lens satisfies the following conditional expression:

$$0.10 < |X1|/ft < 0.26 \tag{8}$$

wherein
   X1: a moving amount of the first lens group to the object side during changing focal length from the wide-angle end to the telephoto end.

9. The zoom lens according to claim 1, wherein,
   when the lens group arranged most on the image side in the zoom lens is defined as a final lens group,
   the focus group comprises the lens group other than a final lens group.

10. The zoom lens according to claim 1, wherein the zoom lens satisfies the following conditional expression:

$$1.40 < f1/fw < 3.20. \tag{9}$$

11. The zoom lens according to claim 1, wherein the first lens group includes at least two lenses having positive refractive power,
    the zoom lens satisfying the following conditional expression:

$$64.0 < vd1pave < 83.0 \tag{10}$$

wherein
    vd1pave: an average value of an Abbe number in a d line of all the lenses having the positive refractive power included in the first lens group.

12. The zoom lens according to claim 1, wherein the zoom lens satisfies the following conditional expression:

$$0.86 < |\beta 2t| < 20.00 \quad (11)$$

wherein

β2t: a lateral magnification when focusing at infinity at the telephoto end of the second lens group.

13. The zoom lens according to claim 1, wherein the zoom lens satisfies the following conditional expression:

$$1.10 < Bfw/(fw \times \tan \omega w) < 3.50 \quad (12)$$

wherein

Bfw: an air conversion length from a surface most on the image side to an image plane at the wide-angle end of the zoom lens, and ωw: a half image viewing angle of a most off-axis main light beam at the wide-angle end of the zoom lens.

14. The zoom lens according to claim 1, wherein the focus group constitutes one lens group that moves independent of the other lens groups during changing focal length, the zoom lens comprising a lens group having positive refractive power at an air interval on the object side of the focus group.

15. The zoom lens according to claim 1, wherein the zoom lens satisfies the following conditional expression:

$$-0.30 < fF/ft < -0.05 \quad (13)$$

wherein fF: a focal length of the focus group.

16. The zoom lens according to claim 1, comprising at least one lens N in or after the third lens group, wherein the lens N is the lens having negative refractive power and satisfies the following conditional expressions:

$$15.0 < vdN < 42.0 \quad (14)$$

$$1.85 < NdN < 2.15 \quad (15)$$

wherein vdN: an Abbe number in a d line of the lens N, and

NdN: a refractive index in the d line of the lens N.

17. The zoom lens according to claim 16, comprising the lens N in the third lens group.

18. An imaging apparatus including the zoom lens according to claim 1, and an image sensor that converts an optical image formed by the zoom lens to an electric signal on an image side of the zoom lens.

19. A zoom lens comprising a first lens group having positive refractive power, a second lens group having negative refractive power, and a third lens group having positive refractive power in order from an object side, and changing focal length by changing an air interval between the respective lens groups, the zoom lens:

comprising a focus group constituted from one lens in or after the third lens group;

moving only the focus group along an optical axis direction when focusing from an infinity object to a proximity object; and satisfying the following conditional expressions:

$$-1.60 < \beta 3rw < -0.35 \quad (1)$$

$$0.75 < f1/\sqrt{(fw \times ft)} < 1.25 \quad (2)$$

$$-0.30 < fF/ft < -0.05 \quad (13)$$

wherein

β3rw: a composite lateral magnification of all lenses arranged from a lens most on the object side in the third lens group to a lens most on an image side in the zoom lens when focusing at infinity at a wide-angle end, f1: a focal length of the first lens group, fw: a focal length of an entire zoom lens at the wide-angle end, ft: a focal length of the entire zoom lens at a telephoto end, and fF: a focal length of the focus group.

* * * * *

UNITED STATES PATENT AND TRADEMARK OFFICE
CERTIFICATE OF CORRECTION

PATENT NO. : 10,976,530 B2
APPLICATION NO. : 15/844881
DATED : April 13, 2021
INVENTOR(S) : Yoshito Iwasawa et al.

Page 1 of 1

It is certified that error appears in the above-identified patent and that said Letters Patent is hereby corrected as shown below:

In the Claims

Column 27, Line 50, Claim 1, delete "<β33rw<" and insert -- <β3rw< --

Column 28, Line 30, Claim 6, delete "–15 0.0" and insert -- –15.0 --

Signed and Sealed this
Twenty-first Day of September, 2021

Drew Hirshfeld
*Performing the Functions and Duties of the*
*Under Secretary of Commerce for Intellectual Property and*
*Director of the United States Patent and Trademark Office*